(12) United States Patent
Kawai et al.

(10) Patent No.: US 11,866,029 B2
(45) Date of Patent: Jan. 9, 2024

(54) WAGON AND MANAGEMENT DEVICE

(71) Applicant: HONDA MOTOR CO., LTD., Tokyo (JP)

(72) Inventors: Toru Kawai, Wako (JP); Masaya Honji, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 266 days.

(21) Appl. No.: 17/210,544

(22) Filed: Mar. 24, 2021

(65) Prior Publication Data
US 2021/0300325 A1 Sep. 30, 2021

(30) Foreign Application Priority Data
Mar. 31, 2020 (JP) ................................ 2020-063099

(51) Int. Cl.
| | |
|---|---|
| *B60W 20/13* | (2016.01) |
| *H04L 29/08* | (2006.01) |
| *B60W 10/08* | (2006.01) |
| *B60W 10/24* | (2006.01) |
| *B60W 10/06* | (2006.01) |
| *B60W 50/14* | (2020.01) |
| *H04L 67/12* | (2022.01) |
| *G01S 19/42* | (2010.01) |

(52) U.S. Cl.
CPC ............ *B60W 20/13* (2016.01); *B60W 10/06* (2013.01); *B60W 10/08* (2013.01); *B60W 10/24* (2013.01); *B60W 50/14* (2013.01); *H04L 67/12* (2013.01); *B60W 2520/00* (2013.01); *B60Y 2400/10* (2013.01); *B60Y 2400/30* (2013.01); *G01S 19/42* (2013.01)

(58) Field of Classification Search
CPC ...... B60W 20/13; B60W 10/06; B60W 10/08; B60W 10/24; B60W 50/14; B60W 2520/00; B60W 2520/16; B60W 2556/10; B60W 2556/50; H04L 67/12; B60Y 2400/10; B60Y 2400/30; G01S 19/42
See application file for complete search history.

(56) References Cited

U.S. PATENT DOCUMENTS

| | | | |
|---|---|---|---|
| 2018/0244263 A1* | 8/2018 | Bower | B60W 10/113 |
| 2019/0264645 A1* | 8/2019 | Siddiqui | F02N 11/0822 |
| 2022/0032898 A1* | 2/2022 | Miyazato | B60W 10/06 |

FOREIGN PATENT DOCUMENTS

JP 2006-146376 6/2006

* cited by examiner

*Primary Examiner* — Brian P Sweeney
(74) *Attorney, Agent, or Firm* — Amin, Turocy & Watson, LLP

(57) ABSTRACT

A wagon includes a communication part configured to communicate with other device, an electric motor configured to generate a traveling driving force, a battery configured to supply electric power to the electric motor, a position sensor configured to acquire position information indicating a position of a host wagon, an attitude detection unit configured to acquire inclination information indicating a tilt of the host wagon, and a controller configured to transmit the position information and the inclination information, which were acquired in a same region, to other device via the communication part while associating the position information and the inclination information.

3 Claims, 15 Drawing Sheets

FIG. 10

| POSITION INFORMATION | INCLINATION INFORMATION | DATE OF UPDATING |
|---|---|---|
| x11, y11 | 12.2 DEGREES, (x12, y12, z12) | FEBRUARY 2, 2020 14:25:31 |
| x21, y21 | 2.3 DEGREES, (x22, y22, z22) | FEBRUARY 2, 2020 14:31:14 |
| x31, y31 | 8.5 DEGREES, (x32, y32, z32) | FEBRUARY 2, 2020 16:29:57 |
| ⋮ | ⋮ | ⋮ |

FIG. 11

| WAGON ID INFORMATION | FUEL RESIDUAL QUANTITY INFORMATION | CHARGING RATE INFORMATION |
|---|---|---|
| 1111 | D1 | E1 |
| 1112 | D2 | E2 |
| 1113 | D3 | E3 |
| ⋮ | ⋮ | ⋮ |

FIG. 12

| ROUTE ID INFORMATION | ROUTE INFORMATION | POWER CONSUMPTION | LOAD INFORMATION |
|---|---|---|---|
| R11 | (x11, y11), (x12, y12), ⋯, (x1a, y1a) | E11 | M11 |
| R12 | (x21, y21), (x22, y22), ⋯, (x2b, y2b) | E21 | M21 |
| R13 | (x31, y31), (x32, y32), ⋯, (x3c, y3c) | E31 | M31 |
| ⋮ | ⋮ | ⋮ | ⋮ |

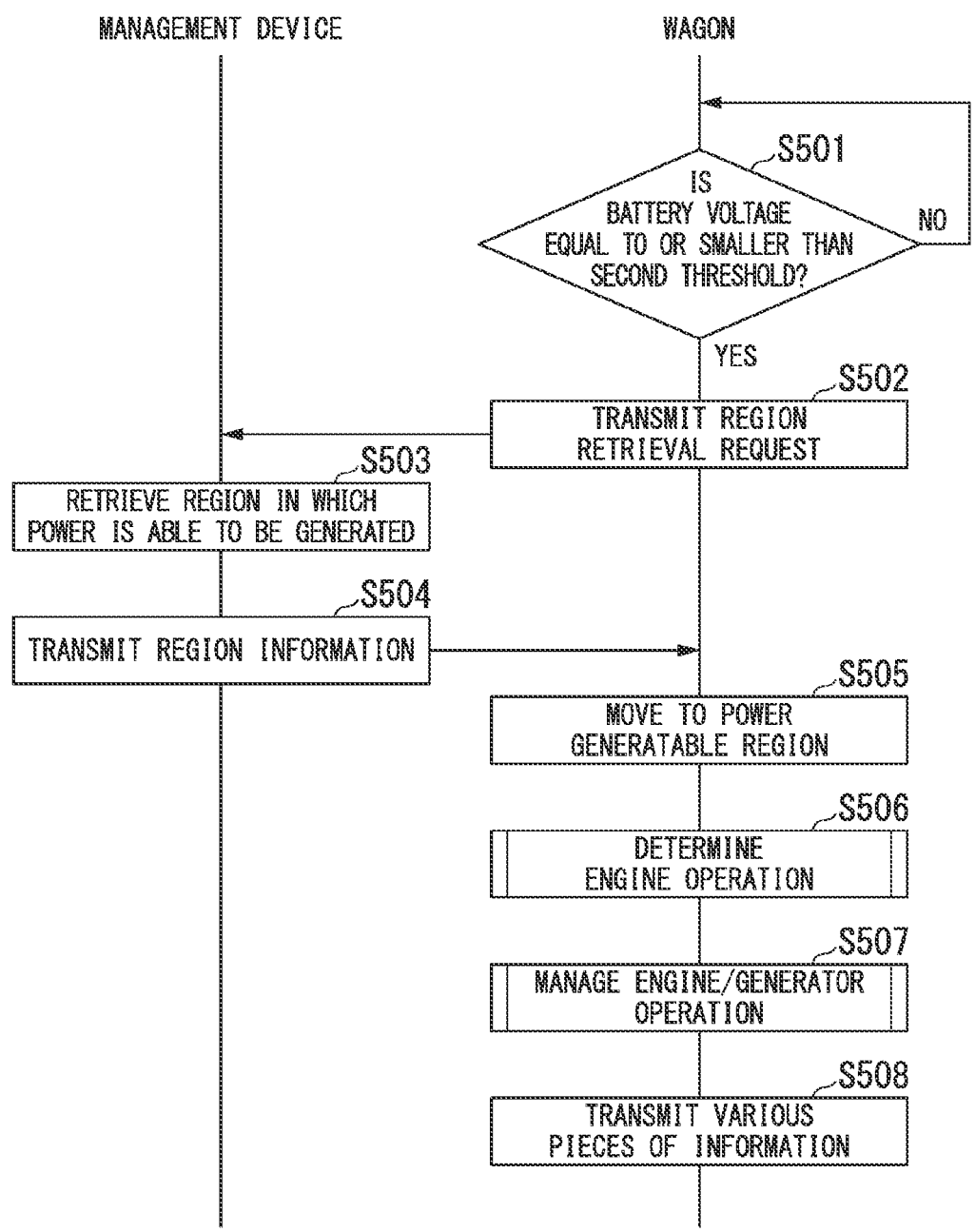

FIG. 16

| POSITION INFORMATION | INCLINATION INFORMATION | REGION ATTRIBUTES | DATE OF UPDATING |
|---|---|---|---|
| x11, y11 | 12.2 DEGREES, (x12, y12, z12) | TRAVELING IS IMPOSSIBLE | FEBRUARY 2, 2020 14:25:31 |
| x21, y21 | 2.3 DEGREES, (x22, y22, z22) | TRAVELING IS POSSIBLE | FEBRUARY 2, 2020 14:31:14 |
| x31, y31 | 8.5 DEGREES, (x32, y32, z32) | STARTING IS IMPOSSIBLE | FEBRUARY 2, 2020 16:29:57 |
| ⋮ | ⋮ | ⋮ | ⋮ |

WAGON AND MANAGEMENT DEVICE

CROSS-REFERENCE TO RELATED APPLICATION

Priority is claimed on Japanese Patent Application No. 2020-063099, filed Mar. 31, 2020, the content of which is incorporated herein by reference.

BACKGROUND OF THE INVENTION

Field of the Invention

The present invention relates to a wagon and a management device.

Description of Related Art

Controlling a traveling body such as a wagon or a working machine when traveling is known. As an example, there is an autonomous mobile robot disclosed in Japanese Unexamined Patent Application, First Publication No. 2006-146376. The autonomous mobile robot includes a distance sensor configured to measure a distance between a main body and a floor in front thereof, and determines whether to continue or stop traveling in response to information related to an inclination or the like in front thereof. Accordingly, unnecessary stoppage due to low down differences in level or narrow grooves is prevented.

SUMMARY OF THE INVENTION

In a traveling body such as a wagon or the like including a driving motor and an engine for generation of power, driving of the engine is controlled according to predetermined rules determined on the basis of energy efficiency or the like. However, since the environment in which a traveling body is placed differs depending on a route, it may not be possible to travel as originally intended, depending on the environment.

An aspect of the present invention provides a technology for more efficiently controlling a traveling body according to the environment.

According to the aspect of the present invention,
there is provided a wagon including:
a communication part that communicates with other device;
an electric motor that generates a traveling driving force;
a battery that supplies electric power to the electric motor;
a position sensor that acquires position information indicating a position of a host wagon;
an attitude detection unit that acquires inclination information indicating a tilt of the host wagon; and
a controller that transmits the position information and the inclination information, which were acquired in a same region, to other device via the communication part while associating the position information and the inclination information.

According to the aspect of the present invention, it is possible to control a traveling body more efficiently in response to the environment.

BRIEF DESCRIPTION OF THE DRAWINGS

FIG. 10 is a view showing a specific example of a position information table.

FIG. 11 is a view showing a specific example of a wagon information table.

FIG. 12 is a view showing a specific example of a route information table.

FIG. 13 is a sequence chart showing a specific example of an operation of a wagon management system.

FIG. 16 is a view showing a variant of the position information table.

DETAILED DESCRIPTION OF THE INVENTION

Hereinafter, an embodiment will be described in detail with reference to the accompanying drawings. Further, the following embodiment is not limited to the invention according to the claims, and not all combinations of characteristics described in the embodiment are essential to the invention. Two or more characteristics of the plurality of characteristics described in the embodiment may be arbitrarily combined. In addition, the same or similar components are designated by the same reference signs, and overlapping description thereof will be omitted.

<Summary of Wagon Management System>

Figure 1:
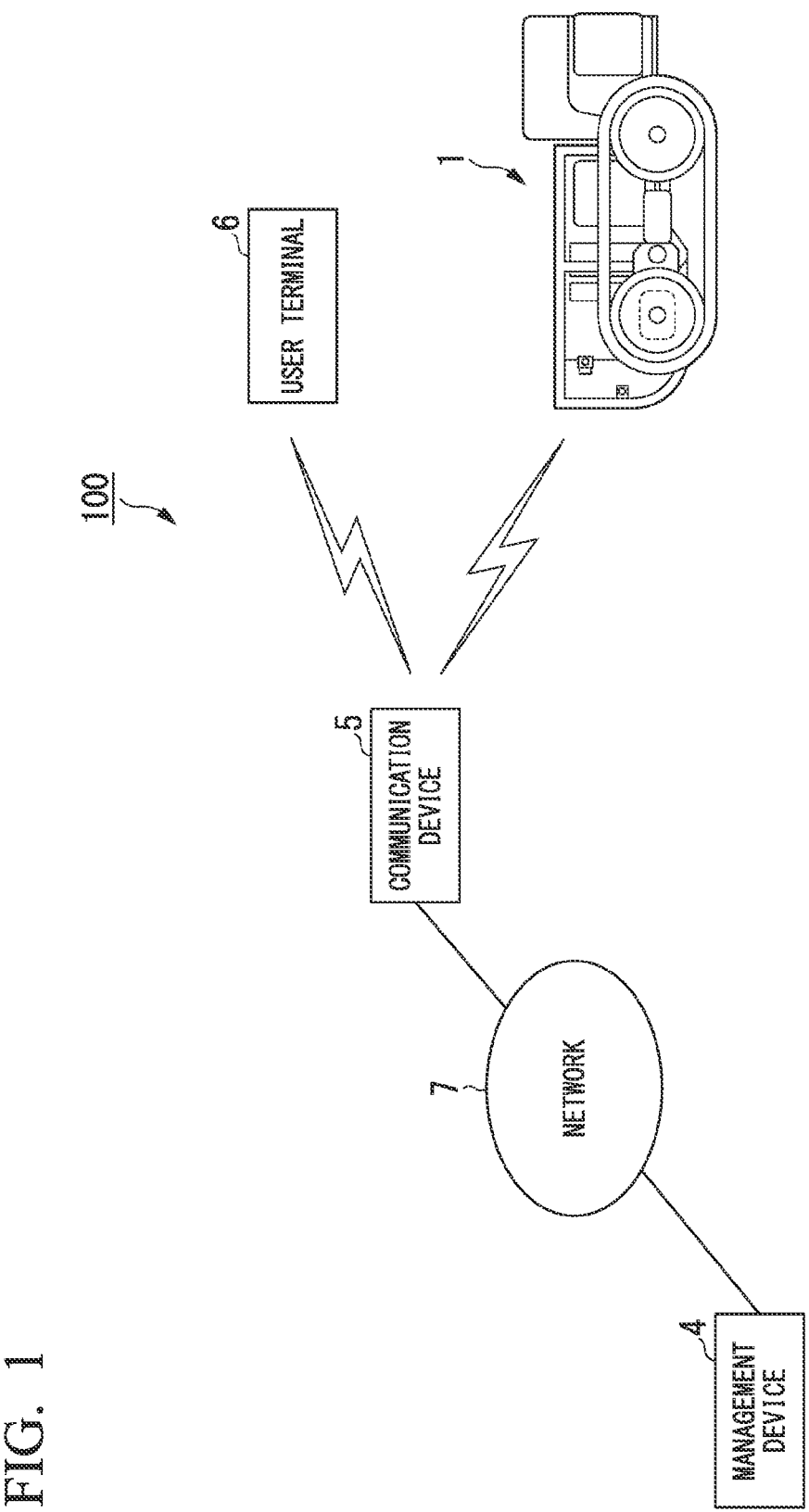
FIG. 1 is a view showing a configuration example of a wagon management system according to an embodiment.

FIG. 1 is a view showing a configuration example of a wagon management system 100 according to an embodiment. The wagon management system 100 includes a wagon 1, a management device 4, a communication device 5 and a user terminal 6. The management device 4 and the communication device 5 are communicatively connected to each other via a network 7. The communication device 5 communicates with the wagon 1 and the user terminal 6 through wireless communication. The communication device 5 may be configured using communication equipment such as a base station device of a moving body communication network, an access point of a wireless local area network (LAN), or the like. A plurality of communication devices 5 are provided in the network 7. The wagon 1 and the user terminal 6 communicate with the management device 4 connected to the network 7 or other information equipment by communicating with the appropriate communication device 5 according to positions thereof. The network 7 may be a network using wireless communication, or may be a network using wired communication. The network 7 may be configured by combining a plurality of networks. In addition, the wagon 1 and the user terminal 6 may be communicatively configured by using communication equipment such as wired communication via cables, short range wireless communication, or the like.

<Summary of Traveling System>

Figure 2:
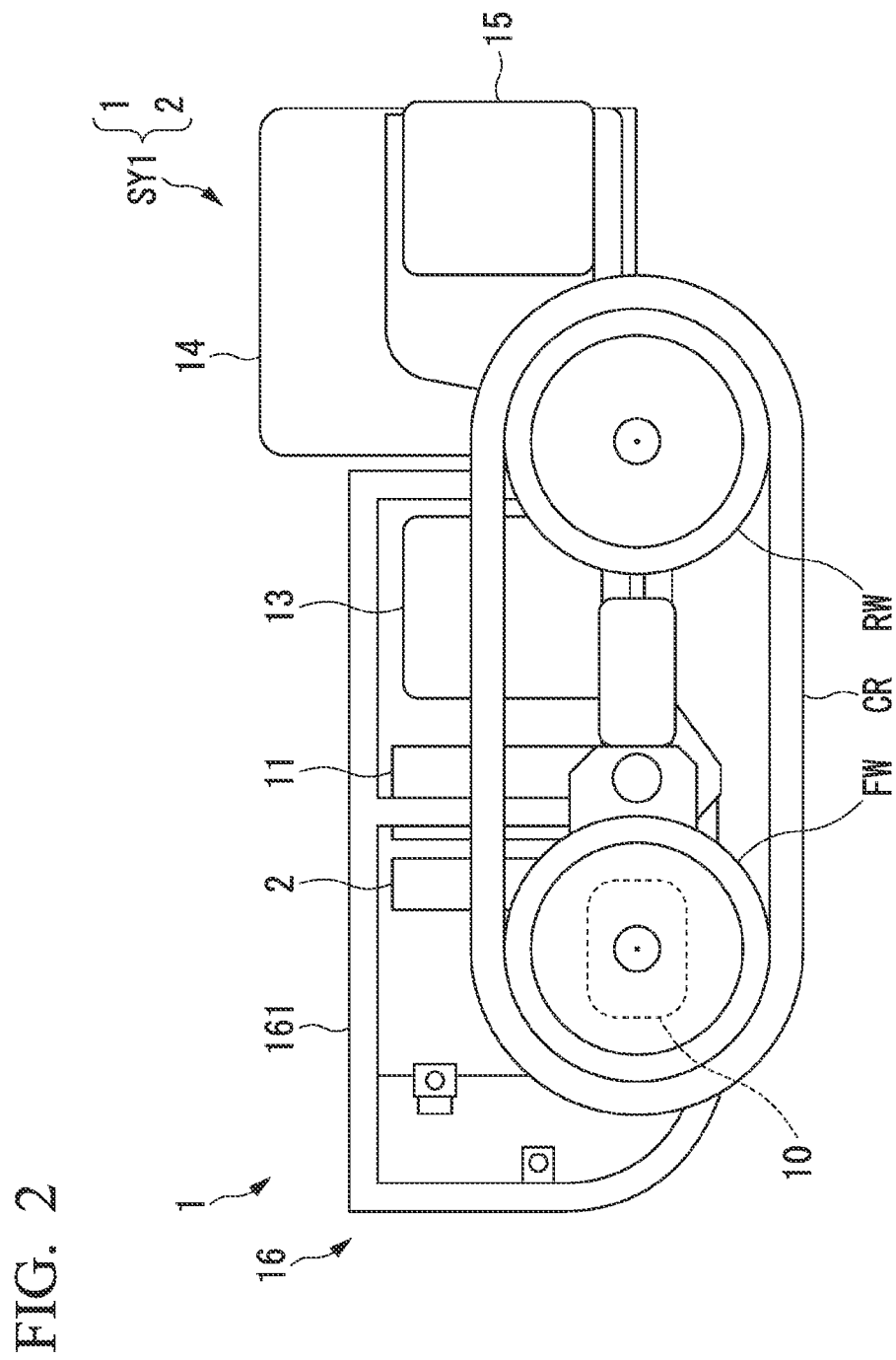
FIG. 2 is a left side view of the system according to the embodiment.
Figure 3:
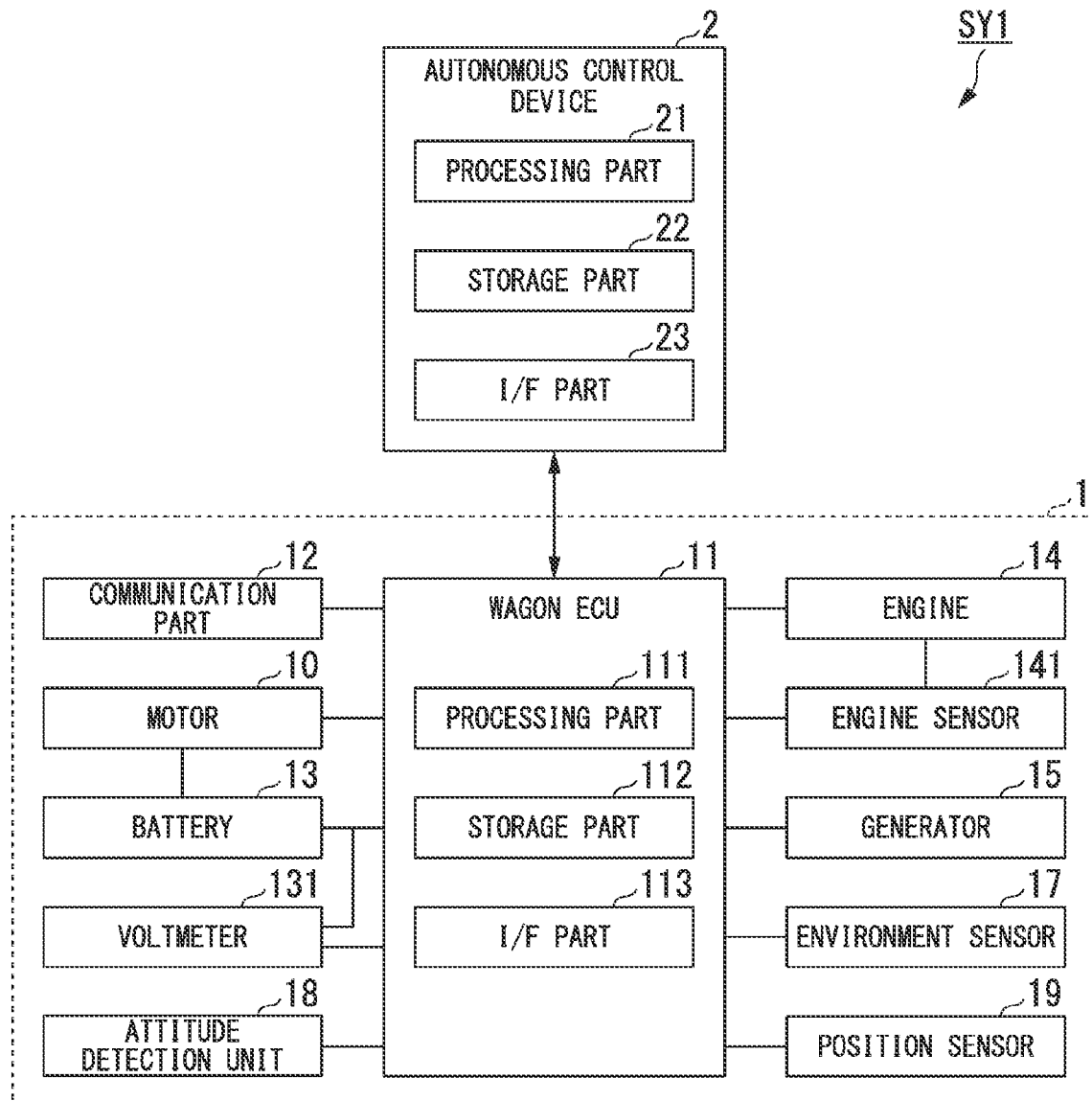
FIG. 3 is a view showing an example of a hardware configuration of the system according to the embodiment.

FIG. 2 is a left side view of a system SY1 according to the embodiment. FIG. 3 is a view showing an example of a hardware configuration of the system SY1. Further, these drawings are schematic views, and portions related to characteristics of the embodiment described below will be mainly described.

The system SY1 is a traveling system including the wagon 1, and an autonomous control device 2 configured to perform control related to a traveling route of the wagon 1. In the embodiment, the wagon 1 can be equipped with the autonomous control device 2. For example, the autonomous control device 2 is supported by a vehicle body frame 16 of the wagon 1. Accordingly, the traveling system SY1 in which the wagon 1 and the autonomous control device 2 are integrally provided is configured. The autonomous control device 2 is configured to be able to communicate with a wagon ECU 11, which functions as a machine controller on the side of the wagon 1, and controls traveling of the wagon 1 by transmitting control signals to the wagon ECU 11. Details of the autonomous control device 2 will be described in the section <Hardware configuration>.

<Summary of Wagon>

The wagon 1 may be used as a conveyance vehicle on which a cargo box or the like is provided, or may be used as a working machine on which components configured to perform predetermined work like a working part 3 (see FIG. 4) are provided. For example, the wagon 1 may be used as a snow removing vehicle, a lawn mower, a farm tractor, or the like. Further, grass, which is a target to be mowed by the lawn mower, includes turf grass and weeds. In addition, in the embodiment, the wagon 1 can be equipped with a control device configured to control traveling of the wagon 1 like the autonomous control device 2. The wagon 1 may be used as a self-propelled wagon or working vehicle by being equipped with a control device that enables autonomous control of the wagon 1. In other words, it can be said that the wagon 1 is a base portion equipped with functional parts configured to exhibit predetermined functions so that it can travel.

The wagon 1 includes a motor 10, the wagon ECU 11, a battery 13, an engine 14, and a generator 15. In addition, the wagon 1 may include front wheels FW, rear wheels RW, crawlers CR, and the vehicle body frame 16.

The motor 10 generates a traveling driving force according to the control of the wagon ECU 11 operated on the basis of the control signal from the autonomous control device 2 that performs traveling control of the wagon 1. In the embodiment, two electric motors are provided as the motor 10, and drive the front wheels FW on the left and right sides, respectively.

The wagon ECU 11 receives a control signal from the autonomous control device 2, and drives components of the wagon 1 such as the motor 10, the engine 14, or the like. In other words, the wagon ECU 11 performs machine control of the wagon 1 on the basis of the control signal from the autonomous control device 2. For example, the wagon ECU 11 can receive a control signal indicating a speed of the wagon 1 from the autonomous control device 2 and control a rotation speed or the like of the motor 10 according to the received speed. Details of the wagon ECU 11 will be described in the section <Hardware configuration>.

The battery 13 supplies electric power to the motor 10. While a case in which the battery 13 is a lead storage battery will be described in the embodiment, the battery 13 may be another secondary battery such as a lithium ion battery or the like. In addition, a design may have any appropriate number of mounted batteries 13. For example, two lead storage batteries may be connected in series.

The engine 14 drives the generator 15 that can charge the battery 13. In the embodiment, the engine 14 is equipped with a cell starter, and it is possible to control starting by the cell starter and stopping by an emergency stop switch from the outside. The generator 15 is rotated by a driving force of the engine 14 and performs power generation. The electricity generated by the generator 15 is stored in the battery 13. While the engine 14 is provided for driving of the generator 15 in the embodiment, a driving force of the engine 14 may be used as a traveling driving force of the wagon 1 according to necessity. That is, the wagon 1 is not limited to a series system, and may be a hybrid vehicle employing another system such as a parallel system, a series/parallel system, or the like.

The front wheels FW, the rear wheels RW and the crawlers CR can configure a traveling mechanism of the wagon 1. In the embodiment, two front wheels FW and two rear wheels RW are separately provided on left and right sides. Further, the endless crawlers CR are wound around the front wheel FW and the rear wheel RW on each of the left and right sides. In the embodiment, since the left and right front wheels FW are driven by the left and right motors 10, the front wheels FW are driving wheels, and the rear wheels RW are driven wheels driven by the front wheels FW via the crawlers CR. However, the wagon 1 may also employ a configuration in which the rear wheels RW are driving wheels and the front wheels FW are driven wheels. In addition, the wagon 1 may be provided with only one of either or both of the front wheels FW and the rear wheels RW, or may be provided with three or more of these. In addition, the wagon 1 may also employ a configuration in which the crawlers CR are not provided.

The vehicle body frame 16 is a member that forms a skeleton of the wagon 1, and is formed of, for example, a metal material. The vehicle body frame 16 supports at least some of the components of the wagon 1 such as the motor 10, the engine 14, or the like. In addition, the vehicle body frame 16 has a mounting part 161 having an upper surface on which predetermined mounting parts can be mounted.

The mounting part 161 can be equipped with a cargo box (not shown), for example, when the wagon 1 is used as a conveyance vehicle. Accordingly, a user or the like can load cargo onto the cargo box. In addition, the mounting part 161 can be equipped with a working device configured to perform predetermined work of the working part 3 or the like, for example, when the wagon 1 is used as a working vehicle. Accordingly, the working vehicle can perform predetermined work using the working device while being made to travel by the wagon 1. Further, the cargo box or the working device that performs predetermined work is not limited to being mounted on the mounting part 161, and may also employ an attachment type configuration in which the cargo box or the working device is attached to any portion of the wagon 1 by a fastening mechanism such as a bolt or the like.

<Hardware Configuration>

The wagon ECU 11 is an electronic control unit (ECU) configured to control operations of the components of the wagon 1. As an example, the wagon ECU 11 performs control of the traveling part and the power system of the wagon 1, i.e., machine control of the wagon 1. The wagon ECU 11 includes a processing part 111, a storage part 112 and an I/F part 113 (an interface part). The processing part 111 is a processor represented by a central processing unit (CPU), and executes a program stored in the storage part 112. The storage part 112 is configured using a storage device such as a magnetic hard disk device, a semiconductor storage device, or the like. The storage part 112 may be configured as, for example, a random access memory (RAM) or a read only memory (ROM). In addition to the program executed by the processing part 111, data or the like used in the processing by the processing part 111 is stored in the storage part 112. The I/F part 113 relays transmission and reception of a signal between various types of instruments provided on the wagon 1 or an external device such as the autonomous control device 2 or the like and the processing part 111. Further, a plurality of ECUs may be provided as the wagon ECU 11. For example, as the wagon ECU, an ECU that controls driving of the motor 10 and an ECU that controls driving of the engine 14 may be provided to be able to communicate with each other.

In addition to the wagon ECU 11, the motor 10, a communication part 12, the battery 13, a voltmeter 131, the engine 14, an engine sensor 141, the generator 15, an environment sensor 17, an attitude detection unit 18 and a position sensor 19 are provided in the wagon 1. These instruments are connected to the wagon ECU 11 via the I/F part 113.

The processing part 111 controls operations of the components of the wagon 1. For example, the processing part 111 controls driving of the motor 10 via a motor driver (not shown) on the basis of the control signal received from the autonomous control device 2. In addition, for example, the processing part 111 controls operations of the engine 14 through processing shown in FIG. 10, FIG. 11 and FIG. 12. In addition, for example, the processing part 111 transmits detection results of the voltmeter 131, the engine sensor 141, the environment sensor 17, the attitude detection unit 18 and the position sensor 19 to the autonomous control device 2 via the I/F part 113. In addition, for example, the processing part 111 generates transmission signals according to the detection results of the voltmeter 131, the engine sensor 141, the environment sensor 17, the attitude detection unit 18 and the position sensor 19, and transmits the transmission signals to another device (for example, the management device 4) via the communication part 12.

The communication part 12 is a communication instrument. The communication part 12 may be configured as, for example, a network interface. The communication part 12 data-communicates with another device (for example, the management device 4) via the network 7 according to the control of the wagon ECU 11. The communication part 12 may be a device that performs wireless communication, or may be a device that performs wired communication.

The voltmeter 131 measures a voltage of the battery 13, and outputs a value indicating the measured result (voltage) to the wagon ECU 11.

The engine sensor 141 is a sensor configured to measure a value related to the engine 14. The engine sensor 141 may be configured using one sensor, or may be configured using a plurality of sensors. The engine sensor 141 may include, for example, an oil level sensor configured to acquire a value related to an amount of the engine oil. The engine sensor 141 may include, for example, a fuel level sensor configured to acquire a value related to an amount of the fuel used by the engine 14. The engine sensor 141 may include, for example, a throttle sensor configured to acquire a value related to a throttle opening angle of the engine 14 or a choke sensor configured to acquire a value related to a choke opening degree. The engine sensor 141 outputs the measured result to the wagon ECU 11.

The environment sensor 17 is a sensor configured to measure a value related to the environment around the wagon 1. The environment sensor 17 may be configured using one sensor, or may be configured using a plurality of sensors. The environment sensor 17 may include, for example, an air temperature sensor configured to measure an air temperature of an external air around the wagon 1. The environment sensor 17 may include, for example, a CO sensor configured to measure a carbon monoxide concentration of an external air around the wagon 1. The environment sensor 17 may include, for example, a motion detector configured to detect presence of a person present around the wagon 1. In addition, the environment sensor 17 may also include a device such as a vibration sensor, a wind speed sensor, a pressure-sensitive contact sensor configured to detect a contact with the outside, or the like. In addition, as the motion detector, for example, a device such as a camera, millimeter wave radar, light detection and ranging (LIDAR), or the like, may be applied. The environment sensor 17 outputs the measured result to the wagon ECU 11.

The attitude detection unit 18 is a sensor configured to measure a value related to an attitude of the wagon 1. The attitude detection unit 18 may be configured using one sensor, or may be configured using a plurality of sensors. The attitude detection unit 18 may include, for example, an angular speed sensor (gyro sensor), or may include an acceleration sensor or a terrestrial magnetism sensor. The attitude detection unit 18 detects, for example, a value indicating an inclination of the host device (the wagon 1). The environment sensor 17 outputs the measured result to the wagon ECU 11.

The position sensor 19 is a sensor configured to measure information (position information) related to a position of the wagon 1. The position information may be expressed by, for example, a latitude and a longitude, or may be expressed using another information indicating a position. The position sensor 19 may be configured using one sensor, or may be configured using a plurality of sensors. The position sensor 19 may include, for example, a sensor of a global navigation satellite system (GNSS). The sensor of a global positioning system (GPS) may be applied to the position sensor 19 as a specific example of the sensor of the GNSS. The position sensor 19 outputs the measured result to the wagon ECU 11.

The autonomous control device 2 is a controller configured to perform traveling control of the wagon 1, for example, an ECU. The autonomous control device 2 includes a processing part 21, a storage part 22, and an I/F part 23 (an interface part). The processing part 21 is a processor represented as a CPU, and executes a program stored in the storage part 22. The storage part 22 is configured using a storage device such as a magnetic hard disk device, a semiconductor storage device, or the like. The storage part 22 may be configured as, for example, a RAM or a ROM. In addition to the program executed by the processing part 21, data or the like used in processing by the processing part 21 is stored in the storage part 22. The I/F part 23 relays transmission and reception of a signal to/from the wagon ECU 11 on the side of the wagon 1 through wired or wireless communication.

The processing part 21 performs traveling control of the wagon 1. In the embodiment, the processing part 21 performs autonomous control of the wagon 1. Specifically, the processing part 21 may perform a traveling plan of setting a designated point, a traveling route, or the like, of the wagon 1, or may control operations of the wagon 1 on the basis of the traveling plan. More specifically, the processing part 21 can transmit a control signal about a moving speed, a moving direction, or the like, of the wagon 1 to the wagon ECU 11 on the basis of the measured results of the various sensors received from the wagon ECU 11 and the traveling plans. Then, the processing part 111 of the wagon ECU 11 may control a driving current or the like of the motor 10 on the basis of the control signal from the processing part 21. In this way, the processing part 21 performs autonomous traveling control of the wagon 1 via the processing part 111.

<Use Example of System>

Figure 4:
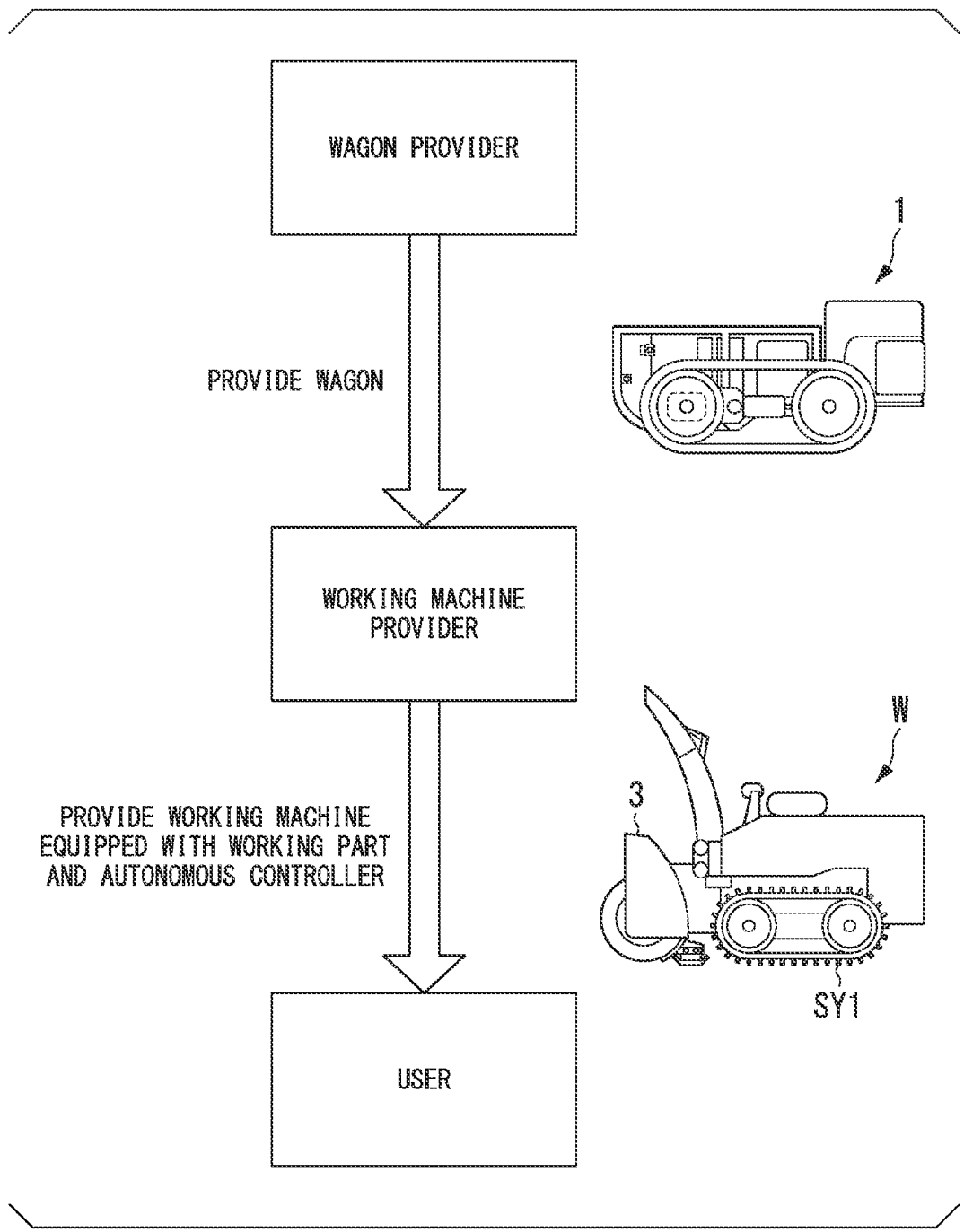
FIG. 4 is a view showing an example of usage of the system according to the embodiment.

FIG. 4 is a view showing a use example of the system SY1 shown in FIG. 2. In this example, the wagon provider provides the wagon 1 to a working machine provider. Then, the working machine provider configures the system SY1 in which the autonomous control device 2 is mounted on the wagon 1, and a working machine W equipped with the working part 3 that performs a predetermined work in the system SY1 is provided to a user as a final product.

In the use example of FIG. 4, the working machine provider does not need to develop the wagon 1, which is a groundsill portion equipped with the autonomous control device 2 or the working part 3, and can provide a service to a user by developing only the autonomous control device 2 or the working part 3 mounted on the wagon 1. In addition, according to the use example, since the autonomous control device 2 can acquire detection results of various sensors 17 via the wagon ECU 11 on the side of the wagon 1, there is no need to construct communication routes between the autonomous control device 2 and the various sensors 17, and the system can be simplified. Accordingly, the working machine provider can reduce development costs for providing the service. Further, the use example is exemplary, and another aspect is also adaptable. For example, when the working machine provider causes the control device that can communicate with the wagon ECU 11 as described below to function as the autonomous control device 2, the wagon 1 may be equipped with the working part 3 to be provided to a user as a working machine while the wagon 1 is not equipped with the autonomous control device 2.

<Processing Example of Wagon ECU>

In the system SY1, the wagon 1 acquires information related to the moved region and transmits the acquired information to the management device 4. According to such an operation, the management device 4 collects various pieces of information in the region where the wagon 1 may move, and can perform more accurate determination with less processing for the subsequent movement of the wagon 1.

Figure 5:
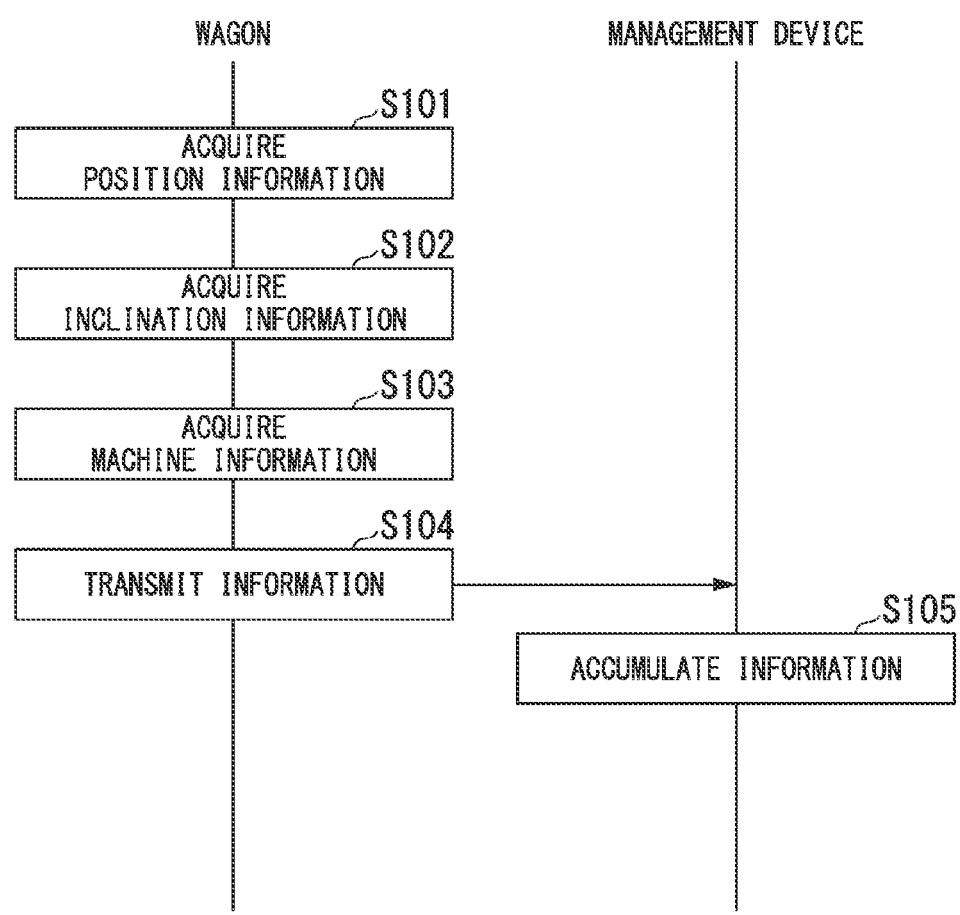
FIG. 5 is a sequence chart showing an example of processing for causing a wagon to acquire information and transmit the information to a management device.

FIG. 5 is a sequence chart showing an example of processing of causing the wagon 1 to acquire information and transmit the acquired information to the management device 4.

In S101, the processing part 111 acquires position information of the host device on the basis of the output of the position sensor 19. Further, each processing after S101 may be performed every predetermined period. For example, the processing part 111 may execute the processing after S101 for a predetermined period while a power supply of the host device is turned ON. For example, the processing part 111 may perform the processing after S101 for the predetermined period only while the host device travels.

In S102, the processing part 111 acquires inclination information indicating the current tilt of the host device on the basis of the output of the attitude detection unit 18. The inclination information at a certain time may be used as information indicating a tilt of the ground surface at a place where the wagon 1 is disposed at that time. The inclination information may be, for example, information indicating how much the state of the wagon 1 is tilted when the horizontal surface is 0 degrees. In this case, the inclination information may further include information indicating an orientation of the tilt (for example, an azimuth). The inclination information may indicate, for example, a normal vector of the wagon 1 with respect to the reference surface. The reference surface of the wagon 1 may be, for example, a surface horizontal to the ground surface on which the wagon 1 is installed.

In S103, the processing part 111 acquires information indicating output of the other sensors (the voltmeter 131, the engine sensor 141 and the environment sensor 17) (hereinafter, referred to as "machine information"). Further, in S103, the processing part 111 does not necessarily have to acquire the information from all sensors of the host device but may acquire the information from the predetermined sensor.

In S104, the processing part 111 generates notification data in which the acquired information and the identification information indicating the host device (hereinafter, referred to as "wagon identification information") are associated with each other. Then, the processing part 111 transmits the notification data to the management device 4.

In S105, the management device 4 receives notification data from the wagon 1. The management device 4 accumulates each of the information and the wagon identification information included in the received notification data in association with each other in the storage device correspondingly.

Next, control of traveling in the system SY1 will be described. In the system SY1, in order to continue traveling by the motor 10, it is necessary to operate the engine 14 to generate electricity with the generator 15 and charge the battery 13. Meanwhile, even when charge of the battery 13 is required, it may be better not to operate the engine 14 depending on the situation of the wagon 1 or surroundings thereof. Here, in the embodiment, the operations of the engine 14 are more effectively controlled by the following processing.

Figure 6:
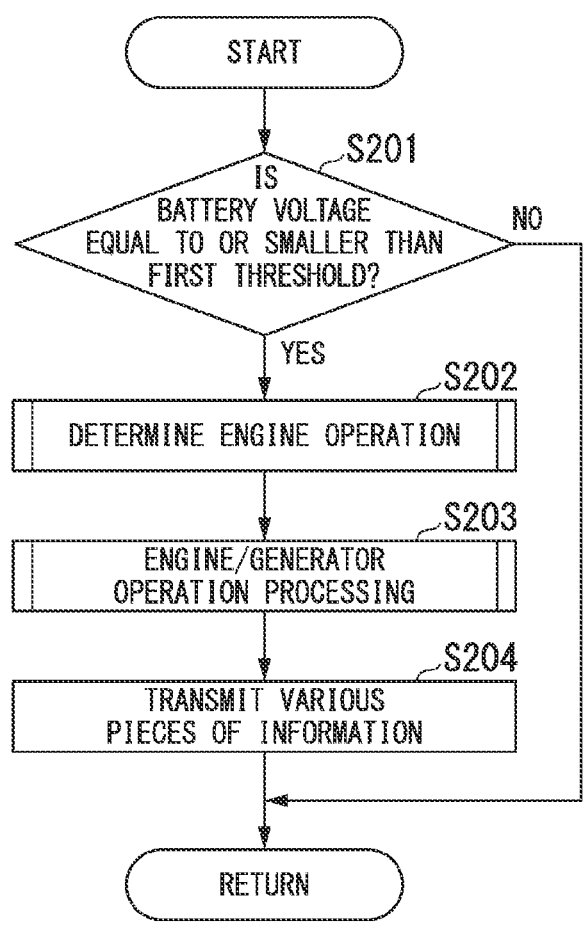
FIG. 6 is a flowchart showing a processing example of the wagon.

FIG. 6 is a flowchart showing a processing example of the wagon ECU 11. The flowchart shows the entire flow of the operation control of the engine 14 by the wagon ECU 11. For example, the flowchart is realized by causing the processing part 111 to read and execute the program stored in the ROM included in the storage part 112 using the RAM included in the storage part 112. In addition, for example, the flowchart can be executed every predetermined period when the engine 14 is not operated.

In S201, the processing part 111 checks whether the voltage of the battery 13 is equal to or smaller than a first threshold. The processing part 111 advances to the processing of S202 when the voltage of the battery 13 is equal to or smaller than the first threshold, and terminates the flowchart when the voltage of the battery 13 exceeds the first threshold. Accordingly, power generation by the following processing is performed when a battery residual quantity of the battery 13 has decreased. In addition, since power generation by the following processing is not performed when the battery residual quantity is sufficient, unnecessary power generation can be suppressed. The first threshold may be set within, for example, a range of 10 to 12 [V] when the battery 13 is a lead storage battery. More specifically, the first threshold may be 10.5 [V]. In addition, when the battery 13 is another secondary battery such as a lithium ion battery or the like, the first threshold according to the type may be appropriately set.

Further, the processing part 111 may terminate the flowchart, for example, even when the cell starter cannot start the engine 14 or the battery voltage drops to the point where the cell starter itself cannot operate (S201: No). That is, the processing part 111 may advance to the processing of S202 when the battery voltage needs to be charged and is within the range in which the engine 14 can be started by the cell starter. Accordingly, it is possible to prevent the cell starter from continuing to rotate or from continuing to send the signal even when the engine 14 cannot be started.

Figure 7:
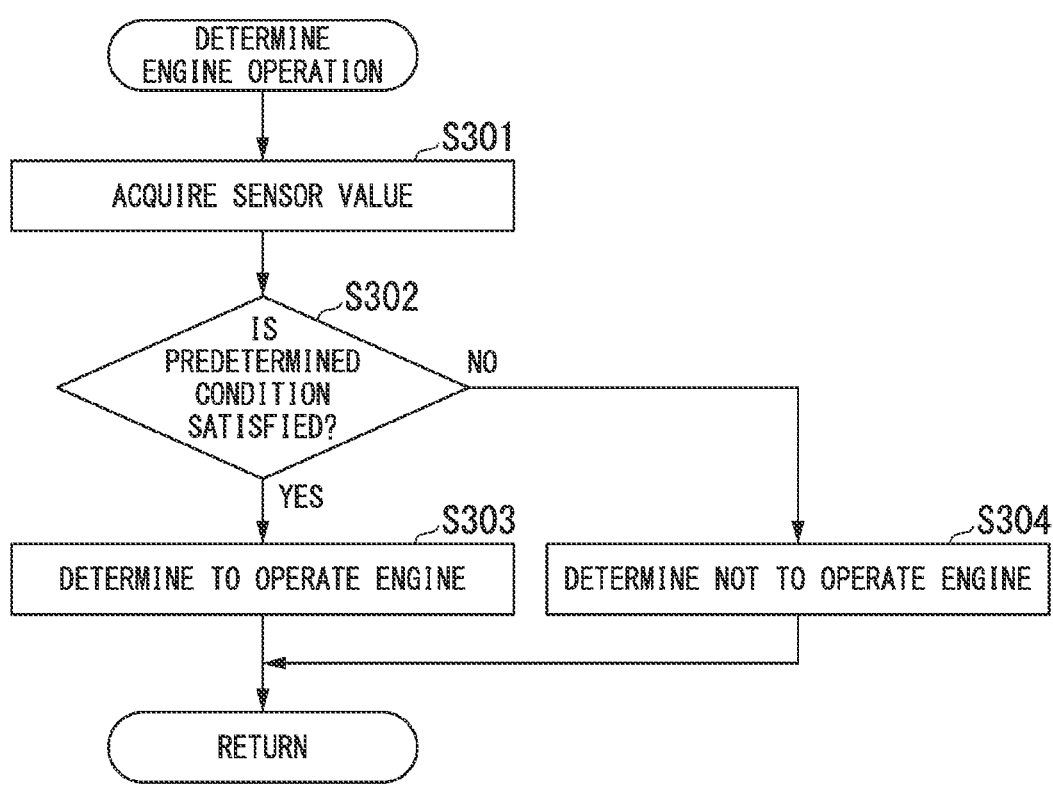
FIG. 7 is a flowchart showing a specific example of a subroutine in the flowchart showing a processing example of the wagon.

In S202, the processing part 111 determines whether the engine 14 is operated. That is, the processing part 111 functions as a determining part configured to determine an operation of the engine 14. An example of the determination processing will be described later (FIG. 7). Further, the processing part 111 determines whether the engine 14 is operated when the voltage of the battery 13 is equal to or smaller than the threshold because the processing of S202 is performed in the case of (S201: Yes).

Figure 8:
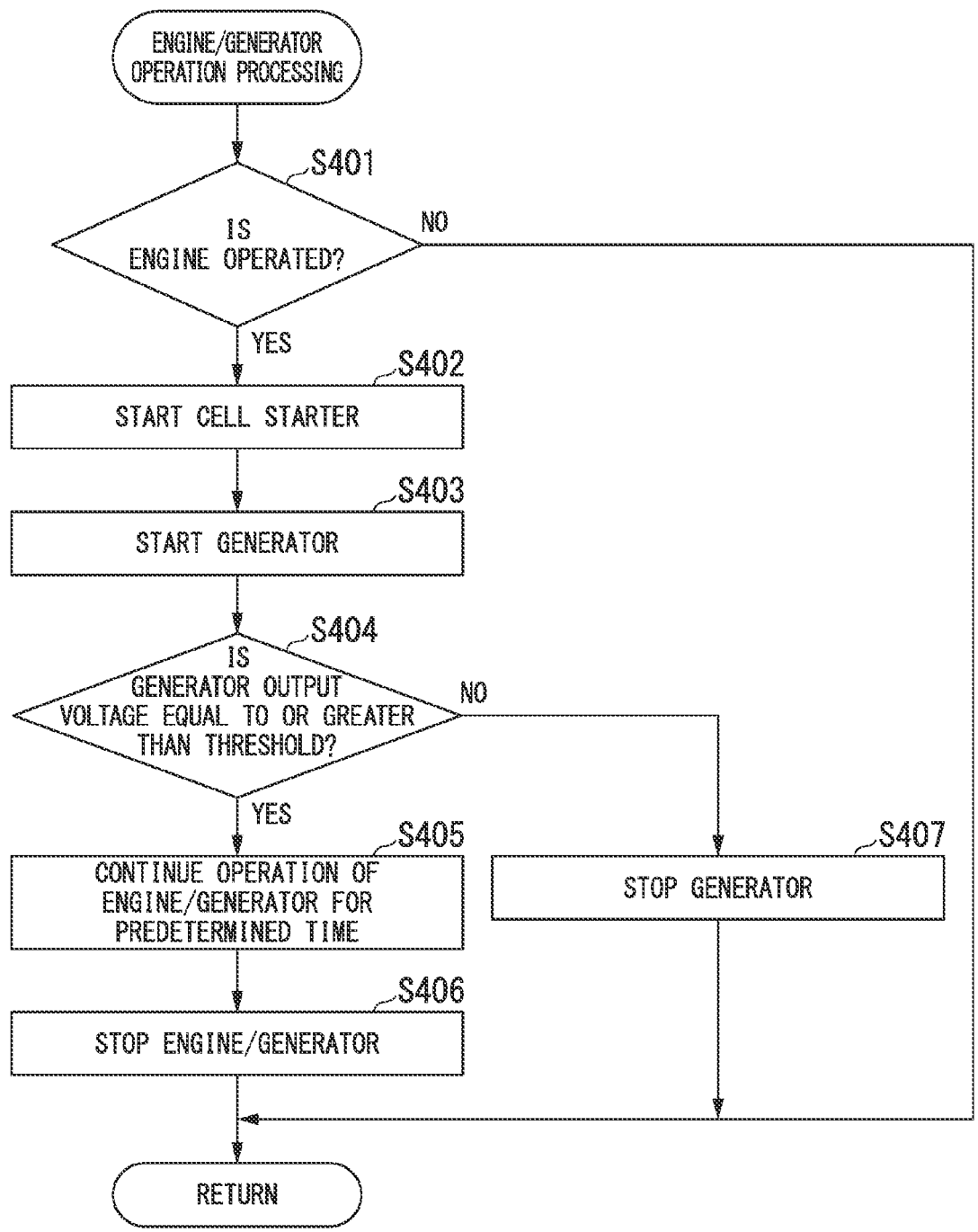
FIG. 8 is a flowchart showing a specific example of a subroutine in the flowchart showing a processing example of the wagon.

In S203, the processing part 111 performs operation processing of the engine 14 or the generator 15. An example of the processing will be described later (FIG. 8).

In S204, the processing part 111 transmits various pieces of information to the autonomous control device 2. For example, the processing part 111 transmits the determination result of the operation determination of the engine 14 in S202 to the autonomous control device 2 via the I/F part 113. That is, the processing part 111 functions as a transmission part configured to transmit the determination result to the autonomous control device 2. Accordingly, a situation of the operation of the engine 14 can be acquired even on the side of the autonomous control device 2. In addition, the processing part 111 may transmit the detection results of various sensors to the autonomous control device 2 as various pieces of information.

Further, a timing when the processing part 111 transmits various pieces of information to the autonomous control device 2 can be appropriately changed. For example, the processing part 111 may transmit the determination result to the autonomous control device 2 after the processing of the operation determination of the engine 14 in S202. In addition, the processing part 111 may transmit the detection result of the various types of sensors every predetermined control period. In addition, the processing part 111 may perform transmission processing of step S204 at the same timing as the transmission processing (step S104) to the management device 4 shown in FIG. 5.

FIG. 7 is a flowchart showing a processing example of the wagon ECU 11, and a flowchart showing a specific example of a subroutine of S202 of FIG. 6.

In S301, the processing part 111 acquires outputs of the various types of sensors (sensor values).

In S302, the processing part 111 checks whether a predetermined condition for operating the engine 14 is satisfied on the basis of the acquired sensor value or the like. The processing part 111 advances to S303 and determines that the engine 14 is operated when the predetermined condition is satisfied (S302: Yes). Meanwhile, the processing part 111 advances to S304 and determines that the engine 14 is not operated when the predetermined condition is not satisfied (S302: No). The processing part 111 terminates the flowchart and returns to the processing of the flowchart of FIG. 6 after the processing of S303 or S304.

In the embodiment, the processing part 111 may determine whether the engine 14 is operated on the basis of whether the information related to the vehicle body of the wagon 1 satisfies the predetermined condition. Accordingly, it is possible to suppress a failure and a start failure of the engine 14 due to an inappropriate operation. Specifically, the processing part 111 may acquire a sensor value of at least one of the engine sensor 141 (the oil level sensor and the fuel level sensor) of the engine 14, the voltmeter 131 of the battery 13, and the attitude detection unit 18 of the wagon 1 in S301. Then, the processing part 111 may determine whether the predetermined condition is satisfied on the basis of the acquired sensor value.

More specifically, when the oil level sensor or the fuel level sensor is configured to output either OK or NG, the processing part 111 may determine that the engine 14 is operated when the detection result is OK. In this case, the oil level sensor or the fuel level sensor outputs a value of OK or NG on the basis of the previously set threshold and the measured value. In addition, when the oil level sensor or the fuel level sensor is configured to output the measured value such as a liquid surface height or the like, the processing part 111 may determine that the engine 14 is operated when the detection result is equal to or greater than the threshold. As described above, by determining whether the engine 14 is operated on the basis of the state of the engine 14, it is possible to suppress the operation in the situation where the engine 14 may have a problem.

In addition, the processing part 111 may determine that the engine 14 is operated when the detection result of the attitude detection unit 18 (a value showing an inclination) is equal to or smaller than the threshold. Accordingly, since the engine 14 is not operated in the circumstance in which the wagon 1 is largely inclined, burning or the like of the engine 14 can be prevented. For example, the threshold may be set to a predetermined value between 0 to 30 degrees. Furthermore, the threshold may be set to a predetermined value within a range of 0 to 20 degrees. That is, the processing part 111 may determine that the engine 14 is operated when the inclination acquired on the basis of the detection result of the inclination sensor is equal to or smaller than the predetermined value within the range of 0 to 20 degrees.

In the embodiment, the processing part 111 may determine whether the engine 14 is operated on the basis of whether the information related to the circumstance around the wagon 1 satisfies the predetermined condition. Accordingly, the operation of the engine 14 can be controlled according to the surrounding circumstance.

Specifically, the processing part 111 may determine whether the engine 14 is operated on the basis of the information about presence of a person around the wagon 1. That is, the processing part 111 may determine not to operate the engine 14 when there is person in the surroundings on the basis of the detection result of the environment sensor 17 (in particular, a motion detector such as a camera, a millimeter wave radar, LIDAR, or the like). Accordingly, it is possible to suppress the operation of the engine 14 in a situation where it may cause discomfort due to engine noise or smell to the surrounding people.

In addition, specifically, the processing part 111 may determine whether the engine 14 is operated on the basis of the information about the carbon monoxide concentration around the wagon 1. More specifically, it may be determined not to operate the engine 14 when the detection result of the environment sensor 17 (in particular, a CO concentration sensor) shows that the CO concentration is equal to or greater than the threshold. Accordingly, for example, it is possible to prevent an increase in CO concentration in a state in which the wagon 1 is indoors. In addition, the processing part 111 may determine not to operate the engine 14 when a person is present around the wagon 1 and the CO concentration is equal to or greater than the threshold. The threshold of the CO concentration may be set to, for example, a range of 10 ppm to 500 ppm.

FIG. 8 is a flowchart showing a processing example of the wagon ECU 11, and a flowchart showing a specific example of a subroutine of S203 in FIG. 6.

In S401, the processing part 111 advances to S402 in a case the engine 14 is operated (S401: Yes) as a result of determination in S202, and terminates the processing in a case the engine 14 is not operated (S401: No). Accordingly, when the processing advances to No at the branch of S401, the flowchart of FIG. 6 is terminated while the engine 14 is not operated.

In S402, the processing part 111 starts the cell starter of the engine 14. For example, the processing part 111 starts the cell starter for a predetermined time. After that, in S403, the processing part 111 starts the generator 15.

In S404, the processing part 111 checks whether the output voltage of the generator 15 is equal to or greater than the threshold, advances to S405 when the output voltage is equal to or greater than the threshold (S404: Yes), and advances to S407 when the output voltage is less than the threshold (S404: No). In the embodiment, from the viewpoint of reduction in the number of parts or the like, the engine 14 may not have a sensor configured to detect a situation of a rotation speed or a load. In this case, the processing part 111 can check whether the engine 14 is operated on the basis of the value of the output voltage of the generator 15. More specifically, when the engine 14 is not normally operated due to some reasons even though the cell starter is started in S402, the output voltage of the generator 15 does not rise even the generator 15 is started in S403. Accordingly, the processing part 111 can check an operation situation of the engine 14 on the basis of the output voltage of the generator 15. Further, when the engine 14 has a sensor configured to detect a rotation speed, an additional situation, or the like, the processing part 111 may advance to S405 when it can be checked that the engine 14 is operated on the basis of these detection results, and may advance to S407 when the operation cannot be checked. Further, the threshold of the output voltage may be set in, for example, a range of 12 to 15 [V]. Furthermore, the threshold of the output voltage may be 14.5 [V]. Further, when the type of the battery 13 is another type of secondary battery such as a lithium ion battery or the like, the threshold of the output voltage may be set according to the type.

In S405, the processing part 111 continues the operations of the engine 14 and the generator 15 for a predetermined time. That is, the processing part 111 can continue the operations of the engine 14 and the generator 15 for the predetermined time when it is checked through processing of S404 that the engine 14 is operated.

In S406, the processing part 111 stops the engine 14 and the generator 15 to terminate the flowchart, and returns to the flowchart of FIG. 6. Meanwhile, when the processing advances from S404 to S407, i.e., when it cannot be checked in S404 that the engine 14 is operated, the processing part 111 stops the generator 15 to terminate the flowchart, and returns to the flowchart of FIG. 6.

Further, since the processing part 111 can periodically execute the flowchart of FIG. 6, when the charge of the battery 13 due to the operations of the engine 14 and the generator 15 in S405 is insufficient, the charge of the battery 13 is performed again in the next control period. The battery 13 can be sufficiently charged by repeating this.

Figure 9:
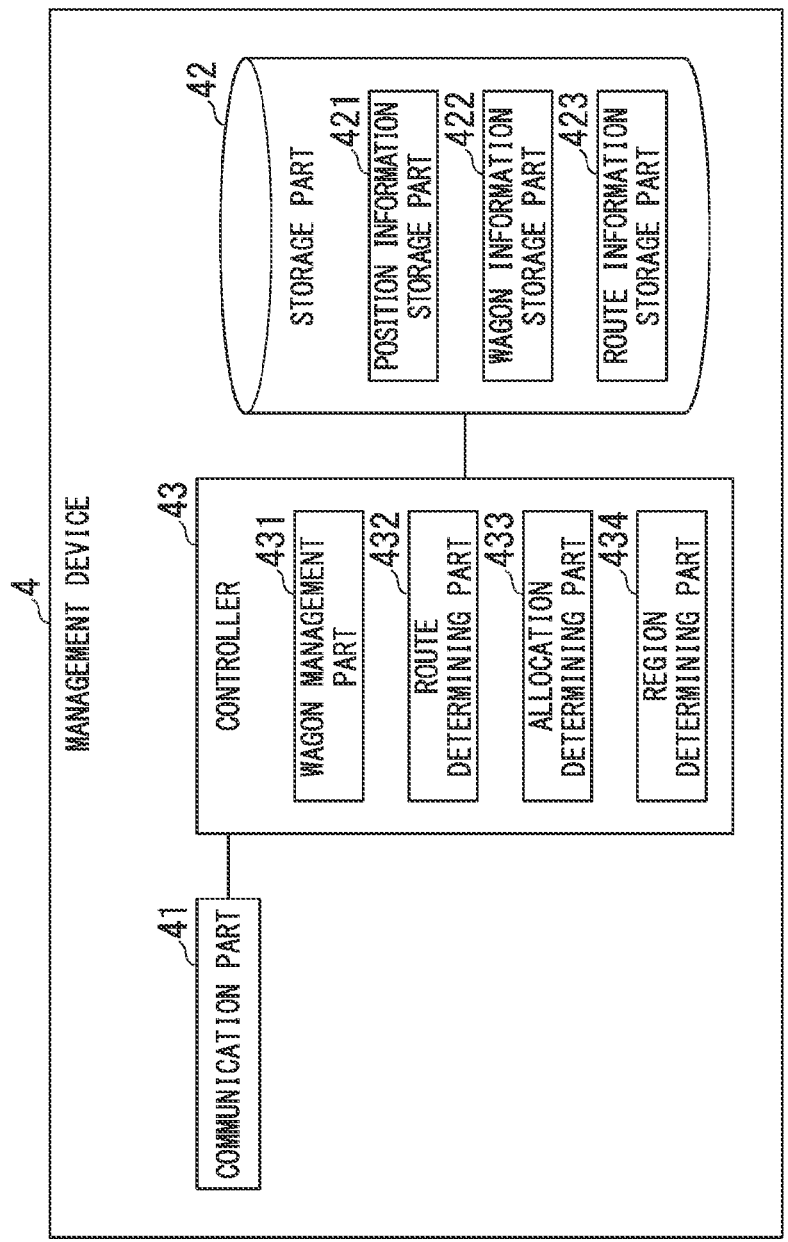
FIG. 9 is a schematic block diagram showing a configuration example of the management device.

FIG. 9 is a schematic block diagram showing a configuration example of the management device 4. The management device 4 is configured using an information instrument such as a personal computer, a server, or the like. The management device 4 includes a communication part 41, a storage part 42 and a controller 43.

The communication part 41 is a communication instrument. The communication part 41 may be configured as, for example, a network interface. The communication part 41 data-communicates with another device via the network 7 according to the control of the controller 43. The communication part 41 may be a device that performs wireless communication or may be a device that performs wired communication.

The storage part 42 is configured using a storage device such as a magnetic hard disk device, a semiconductor storage device, or the like. The storage part 42 stores data used by the controller 43. The storage part 42 functions as, for example, a position information storage part 421, a wagon information storage part 422 and a route information storage part 423.

The position information storage part 421 stores a position information table. FIG. 10 is a view showing a specific example of the position information table. The position information table has a plurality of position information records. The position information record has values of position information, inclination information and a date and time of updating.

The position information indicates a position in a region in which the wagon 1 may move. The position information has, for example, values of a latitude and a longitude. The inclination information indicates an inclination of a ground surface at a position indicated by the position information of the position information record. The inclination information may further have information indicating an orientation of the inclination. In the specific example of FIG. 10, the inclination information has information indicating an angle of the inclination, and information indicating a normal vector in an inclination surface of the ground surface. The date and time of updating indicates a date and time when the position information record is updated.

For example, in the example of the position information record of a top row of FIG. 10, an inclination angle of a ground surface at a position referred to as (x11, y11) is 12.2 degrees, and a normal vector in an inclination surface of the ground surface is (x12, y12, z12). In addition, the position information record was updated on Feb. 2, 2020 at 14:25:31. By performing the traveling control based on such position information table, even for the wagon 1 that does not have the sensor such as the attitude detection unit 18 or the like, it is possible to appropriately perform the control related to starting of the engine 14 according to the inclination.

The wagon information storage part 422 stores a wagon information table. FIG. 11 is a view showing a specific example of the wagon information table. The wagon information table has a plurality of wagon information records. The wagon information record has values of wagon identification information, fuel residual quantity information and charging rate information.

The wagon identification information indicates identification information allocated to each of the wagons 1. The fuel residual quantity information indicates an amount of the fuel remaining in the wagon 1 indicated by the wagon identification information of the wagon information record. The fuel indicated by the fuel residual quantity information is the fuel used to drive the engine 14. The charging rate information indicates a charging rate of the battery 13 remaining in the wagon 1 indicated by the wagon identification information of the wagon information record.

For example, in the example of the wagon information record of the top row of FIG. 11, a fuel residual quantity of the wagon 1 of the wagon identification information referred to as "1111" is D1, and a charging rate is E1. Determination of how much distance the wagon 1 can travel after this, or the like, can be performed on the basis of the value of the wagon information record.

The route information storage part 423 stores a route information table. FIG. 12 is a view showing a specific example of the route information table. The route information table has a plurality of route information records. The route information record has values of route identification information, route information, power consumption and load information.

The route identification information indicates identification information allocated to a route in which any one wagon 1 traveled in the past (hereinafter, referred to as "an existing route"). The route information indicates a road of the existing route indicated by the route identification information of the route information record. For example, the route information may be indicated by a set of pieces of discrete position information obtained at a predetermined distance interval, a predetermined moving interval or a predetermined time interval. The power consumption indicates total electric energy consumed when the wagon 1 travels in the existing route indicated by the route identification information of the route information record. The load information indicates a weight of cargo loaded when the wagon 1 travels in the existing route indicated by the route identification information of the route information record.

In combination of one piece of route identification information and one piece of route information, combinations of a plurality of different power consumptions and pieces of load information may correspond to each other. That is, when one or a plurality of wagons 1 have traveled one or more times for one existing route, the power consumption and the load information obtained upon every traveling may be stored in the route information storage part 423. Such a route information record may be generated on the basis of, for example, the information obtained by processing of the wagon 1 shown in FIG. 5. That is, the route information record can be generated by obtaining the position information upon traveling and the output of the voltmeter 131 at that time at a predetermined period. Generation of such a route information record may be executed by, for example, a wagon management part 431.

By using the value of the route information record when the wagon 1 newly travels in the same route as one of the existing routes, the power consumption required for the traveling can be predicted according to the planned load.

Returning to FIG. 9, description of the management device 4 will be continued. The controller 43 is configured using a processor such as a CPU or the like and a memory. The controller 43 functions as the wagon management part 431, a route determining part 432, a car allocation determining part 433 and a region determining part 434 by executing a program using a processor. Further, some or all of the functions of the controller 43 may be realized using hardware such as an application specific integrated circuit (ASIC), a programmable logic device (PLD), a field programmable gate array (FPGA), or the like. The program may be recorded on a computer-readable recording medium. The computer-readable recording medium is a portable medium such as a flexible disk, a magneto-optic disk, a ROM, a CD-ROM, a semiconductor storage device (for example, a solid state drive (SSD)), or the like, or a storage device such as a hard disk, a semiconductor storage device, or the like, installed in a computer system. The program may be transmitted via an electric communication line. The wagon management part 431 receives information from the wagon 1, and updates values of records stored in the storage part 42 using the received information. For example, the wagon management part 431 updates values of the position information record on the basis of the position information and the inclination information received from the wagon 1. For example, the wagon management part 431 updates values of the wagon information record on the basis of the wagon identification information, the fuel residual quantity information and the charging rate information received from the wagon 1. For example, the wagon management part 431 adds a new route information record on the basis of the received information when the route information of the actually traveled existing route or the route identification information and the load information and power consumption upon traveling are received from the wagon 1.

When request information of allocation is received from the user terminal 6, the route determining part 432 determines candidates of routes in which the wagon 1 travels on the basis of the received request information. Then, the route determining part 432 generates information indicating candidates of routes (hereinafter, referred to as "route candidate information") on the basis of the determination result. The route determining part 432 may generate a plurality of pieces of route candidate information with respect to one piece of request information. For example, when information indicating a first destination and a second destination is included in the request information, the route determining part 432 may generate route candidate information on the basis of these pieces of information.

The first destination is a destination at which the wagon 1 arrives first. For example, the first destination may be a position at which cargo is loaded on the wagon 1 by a requester (user). The second destination is a destination at which the wagon 1 arrives next. For example, the second destination may be a destination to which the wagon 1 with the loaded cargo conveys the cargo. The wagon 1 may be controlled to move to the first destination from the base, move to the second destination after that, unload the cargo at the second destination, and then, return to the base. Further, the base located before moving to the first destination and the base to which the wagon 1 moves to after moved to the second destination may be the same base or may be different bases. Candidates of the routes determined by the route determining part 432 may be a route returning to a base from the base via the first destination and the second destination.

The car allocation determining part 433 determines the wagon 1 to be dispatched for the request information received from the user terminal 6. The car allocation determining part 433 may determine the wagon 1 to be dispatched on the basis of, for example, the route candidate information generated by the route determining part 432 and the information of the wagon information storage part 422 showing the current state of each of the wagons 1. The car allocation determining part 433 may determine the wagon 1 by predicting power consumed when traveling in each route candidate on the basis of, for example, the route candidate information, and determining the wagon 1 that can fully run through on the basis of the residual quantity of the fuel and the charging rate of the battery 13.

The car allocation determining part 433 may perform more accurate prediction on the basis of the inclination information of the positions stored in the position information storage part 421 when the power consumption is predicted. The car allocation determining part 433 may perform more accurate prediction on the basis of the cargo information (weight or type) included in the request information received from the user terminal 6 when the power consumption is predicted. The car allocation determining part 433 may predict the power consumption by using the past achievement information similar to the route or the load according to the request information as it is on the basis of the information stored in the route information storage part 423 or performing the predetermined correcting processing. In this case, the correcting processing may be performed on the basis of, for example, the predetermined standard according to a difference and ratio of weights of the cargos. The power consumption can be predicted with a smaller calculation amount by using the information of the route information storage part 423 in this way.

The region determining part 434 determines a region for the wagon 1 where power generation is possible by starting of the engine 14 (hereinafter, referred to as "a power generatable region"). As described above, when the engine 14 is started at a place where an inclination is large, troubles such as burning of the engine 14, a fuel supply failure, or the like, may occur. For this reason, it is desirable to operate the engine 14 in an inclination where troubles such as burning or the like cannot occur for the engine 14. The region with such an inclination is determined as the power generatable region.

The region determining part 434 determines the power generatable region closest to the wagon 1 when the request for the region retrieval is received from the wagon 1. The term "closest to" may mean that a physical traveling distance is shortest or power consumption required for movement is smallest, or may be defined by another standard.

FIG. 13 is a sequence chart showing a specific example of an operation of the wagon management system 100. The wagon 1 may start the operation of the sequence chart shown in FIG. 13 at a predetermined period.

In S501, the processing part 111 checks whether the voltage of the battery 13 is equal to or smaller than the second threshold. The processing part 111 advances to the processing of S502 when the voltage of the battery 13 is equal to or smaller than the second threshold, and terminates the sequence chart when the voltage of the battery 13 exceeds the second threshold. Further, it is desirable that the second threshold is a value that indicates a state in which it is possible to travel for a while only by the charging rate of the battery 13 without operating the engine 14 yet. For this reason, for example, the second threshold may be set as a value greater than the first threshold. By setting in this way, when the voltage of the battery 13 becomes smaller than the first threshold, the wagon 1 can be already located in the power generatable region or near the power generatable region.

In S502, the processing part 111 generates a region retrieval request. The region retrieval request is information that requires retrieval and notification of the power generatable region. It is desirable that the required power generatable region is a position where arrival is possible with the power storage amount of the current battery equal to or smaller than the second threshold. In generation of the region retrieval request, the processing part 111 acquires the position information of the host device (the wagon 1) on the basis of the output of the position sensor 19, and includes the position information in the region retrieval request. In addition, the processing part 111 may include the wagon identification information of the host device in the region retrieval request. The processing part 111 transmits the region retrieval request to the management device 4 via the communication part 12.

In S503, when the region retrieval request is received, the region determining part 434 of the management device 4 acquires the position information from the received region retrieval request. The region determining part 434 retrieves the power generatable region disposed close thereto on the basis of the acquired position information. As described above, it is desirable that "close" disclosed herein is a position at which the wagon 1 can arrive with the power storage amount of the current battery equal to or smaller than the second threshold. The region determining part 434 may retrieve the power generatable region on the basis of, for example, the information stored in the position information storage part 421.

The region retrieval request may include a value indicating an inclination in which the wagon 1 of the request source can operate the engine 14. In this case, the region determining part 434 retrieves the power generatable region on the basis of the value indicating the inclination at which the engine 14 can be operated. According to the above-mentioned configuration, even when the inclination at which the engine 14 can be operated differs according to properties (a type or specification) of the wagon 1, it is possible to retrieve the power generatable region according to the specification of the wagon 1. For example, when the engine 14 includes an actuator configured to keep the attitude horizontal, the power generatable region may be determined by taking into account the attitude control of the engine 14 by the actuator.

The storage part 42 may store the information in which the wagon identification information and the value indicating the inclination at which the engine 14 can be operated in each wagon 1 correspond to each other. In this case, the same processing as the above-mentioned processing can be performed by including the wagon identification information in the region retrieval request.

In S504, the region determining part 434 of the management device 4 generates the region information including the position information indicating the retrieval result. The region determining part 434 transits the generated region information to the wagon 1 of the request source.

In S505, the processing part 111 of the wagon 1 receives the region information from the management device 4. The processing part 111 moves the wagon 1 to a position indicated by the position information included in the received region information. After that, the processing part 111 continues movement until the position information output by the position sensor 19 and the position information included in the region information approach to each other in a predetermined distance. When two pieces of position information approach each other in the predetermined distance, the processing part 111 executes the processing of S506.

In S506 to S508, the processing part 111 executes the processing of S202 to S204 shown in FIG. 6.

Figure 14:
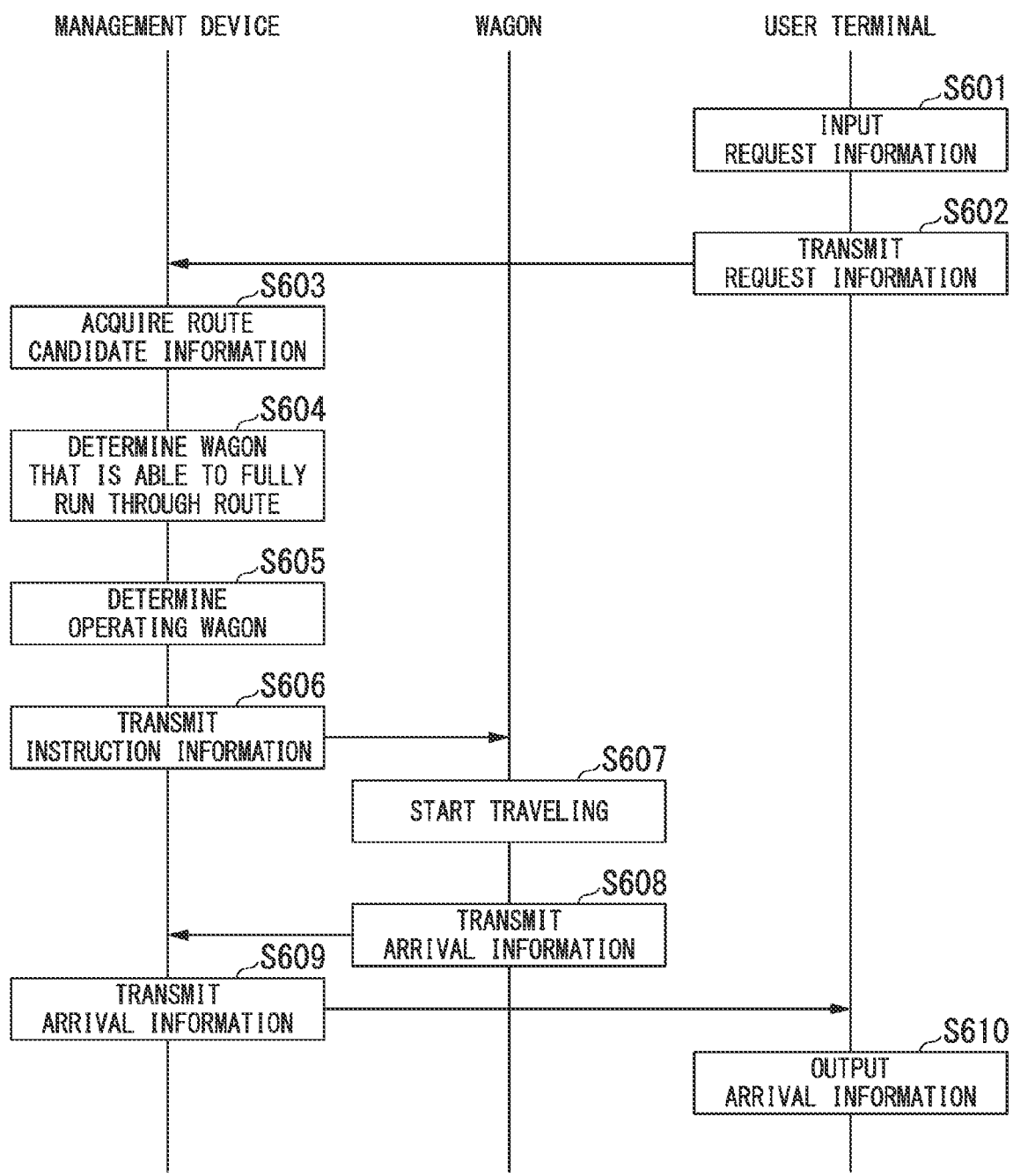
FIG. 14 is a sequence chart showing a specific example of an operation of the wagon management system.

FIG. 14 is a sequence chart showing a specific example of an operation of the wagon management system 100. A user who wishes to use the wagon 1 requests allocation of the wagon 1 by operating the user terminal 6, and uses the wagon 1 that has come to the specified position. Hereinafter, a specific example of such processing will be described.

In S601, a user inputs request information by operating the user terminal 6. The request information may include, for example, position information of the first destination, position information of the second destination, and information related to the planned cargo (weight, type, or the like). The user terminal 6 receives input of each information according to the operation of the user.

In S602, the user terminal 6 generates request information including the input information. The user terminal 6 transmits the generated request information to the management device 4. The request information may further include identification information of a user.

In S603, the route determining part 432 of the management device 4 transmits the request information. The route determining part 432 acquires position information of the first destination and the second destination from the received request information. The route determining part 432 generates one or a plurality of pieces of route candidate information on the basis of the position information of the base of each of the wagons 1, and the position information of the first destination and the second destination.

In S604, the car allocation determining part 433 of the management device 4 determines the wagon 1 that can fully run through the route on the basis of the route candidate information generated by the route determining part 432. For example, such determination may predict power consumed when traveling in each of the route candidates on the basis of the route candidate information, and determine the wagon 1 that can fully run through the route on the basis of the residual quantity of the fuel and the charging rate of the battery 13.

In S605, the car allocation determining part 433 of the management device 4 determines the wagon 1 (operation wagon) allocated to the user. The car allocation determining part 433 may determine the wagon 1 as the operation wagon, for example, when there is only one wagon 1 that is determined to be able to fully run in the processing of S604. The car allocation determining part 433 may determine the operation wagon on the basis of the predetermined standard from the plurality of wagons 1, for example, when the plurality of wagons 1 are determined as being able to fully run in the processing of S604. The predetermined standard may be, for example, the shortest distance from the current position to the first destination. The predetermined standard may be, for example, the greatest current power storage amount. The predetermined standard may be, for example, the greatest current fuel residual quantity. The predetermined standard may be, for example, the longest travelable distance on the basis of the current fuel residual quantity and power storage amount. The predetermined standard may be another standard.

In S606, the car allocation determining part 433 transmits the instruction information to the wagon 1 determined as the operation wagon. The instruction information includes route information to the first destination.

In S607, the processing part 111 of the wagon 1 receives the instruction information. The processing part 111 starts the traveling on the basis of the route information included in the received instruction information. After the traveling is started, the processing part 111 controls a moving direction and performs movement along the route on the basis of the output of the position sensor 19 at the predetermined period. The processing part 111 repeatedly executes determination of whether the wagon has arrived at the first destination on the basis of the output of the position sensor 19. The processing part 111 executes the processing of S608 when it is determined that the wagon has arrived at the first destination. Further, the wagon 1 repeatedly execute the processing shown in FIG. 5, the processing shown in FIG. 6, or the processing shown in FIG. 13, at a predetermined period during the processing of S607 and the processing of S608.

In S608, the processing part 111 generates the arrival information indicating that the wagon has arrived at the first destination. Then, the processing part 111 transmits the arrival information to the management device 4.

In S609, the car allocation determining part 433 of the management device 4 receives the arrival information. The car allocation determining part 433 transmits the arrival information to the user terminal 6 that is a transmission source of the request information when the arrival information is received.

In S610, the user terminal 6 receives the arrival information. The user terminal 6 outputs the received arrival information when the arrival information is received. The output of the arrival information may be performed in any aspect. For example, the user terminal 6 may display characters or images indicating the arrival information on a display. For example, the user terminal 6 may output sound indicating the arrival information from a speaker. For example, the user terminal 6 may cause a vibrator to vibrate in a predetermined pattern indicating arrival. The user can know that the wagon 1 has arrived at the first destination according to the output of the user terminal 6.

After that, the user puts the desired cargo on the wagon 1. The user operates the user terminal 6, and when it is input that a work of loading the cargo is completed, a user terminal 1 transmits the information indicating that the work is terminated to the management device 4. The management device 4 instructs movement to the second destination to the wagon 1. The wagon 1 moves to the second destination according to the instruction. When the wagon 1 arrives at the second destination, a user or a person concerned therewith unloads the cargo from the wagon 1. The user operates the user terminal 1, and when it is input that a work of unloading the cargo is terminated, the user terminal 1 transmits the information indicating that the work is terminated to the management device 4. The management device 4 instructs the wagon 1 to move to the base. The wagon 1 moves to the base according to the instruction.

As described above, according to the embodiment, it is possible to more efficiently control the traveling of the wagon 1 according to the environment upon the traveling of the wagon 1. Specifically, this is as follows. The wagon 1 can travel by driving the motor 10 using electric power stored in the battery 13 even in a state in which the engine 14 is not driven. However, when the situation in which the engine 14 is not started is continued in a state in which the power storage amount of the battery 13 is small, there is a risk that the power storage amount of the battery 13 will eventually become zero and the wagon will become impossible to travel. In response to such problem, in the embodiment, when the power storage amount of the battery 13 becomes small (equal to or smaller than the second threshold), the wagon 1 is controlled to move to the power generatable region in which the engine 14 can be started on the basis of the tilt of the terrain or the like. For this reason, it is possible to avoid the situation in which the engine 14 cannot be started due to the environment upon traveling, and the wagon 1 can continue the traveling more efficiently.

In addition, the wagon 1 repeatedly executes the processing as shown in FIG. 5, and actual values of various pieces of information obtained by actual traveling of the wagon 1 are stored in the management device 4. The stored information is, for example, inclination information of the wagon 1 at each position (information indicating a tilt of the terrain), machine information indicating outputs of the sensors (the voltmeter 131, the engine sensor 141, and the environment sensor 17), or the like. After that, it is possible to determine a route on traveling of the wagon 1 after that or determine a power generatable region or the like using the various pieces of stored information. Further, it is possible to estimate the total amount of power consumption required for traveling in each route with a smaller calculation amount on the basis of the route information table shown in FIG. 12.

Another Embodiment

Figure 15:
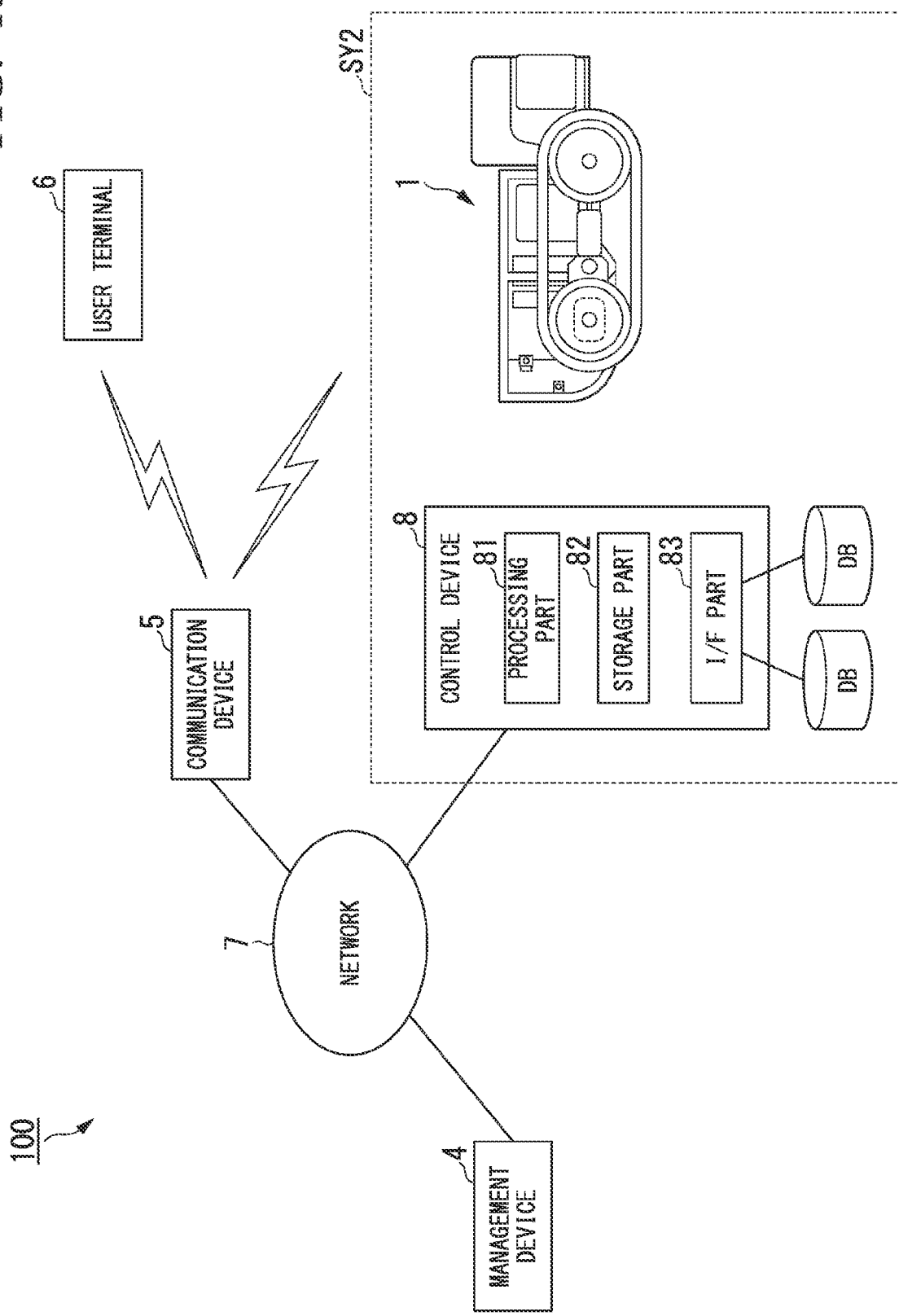
FIG. 15 is a view showing a configuration example of a system according to another embodiment.

While the system SY1 is configured by mounting the autonomous control device 2 on the wagon 1 in the embodiment, an example in which the autonomous control device 2 constitutes a system without being mounted on the wagon 1 may be employed. That is, an example in which the autonomous control device 2 performs traveling control of the wagon 1 remotely can also be employed. FIG. 15 is a view showing a configuration example of a system SY2 according to another embodiment. Further, in the following description, the same components as the embodiment are designated by the same reference signs and description thereof will be omitted.

In FIG. 15, the system SY2 includes one or a plurality of wagons 1, and a control device 8 configured to communicate with the wagons 1.

The control device 8 is configured using an information instrument such as a server, a personal computer, or the like. The control device 8 performs management of the vehicle body information of the wagon 1 or traveling control of the wagon 1. In addition, the control device 8 may be installed in, for example, an office or the like of a wagon provider or a working machine provider. The control device 8 includes a processing part 81, a storage part 82, and an I/F part 83 (an interface part).

The processing part 81 is a processor represented by a CPU, and executes a program stored in the storage part 82. For example, the processing part 81 functions as an autonomous controller of the wagon 1 by executing the program on the traveling control of the wagon 1. That is, the processing part 81 remotely controls the traveling of the wagon 1. Here, the processing part 81 performs transmission and reception of a signal with the wagon ECU 11 of the wagon 1 via the I/F part 83 and the network 7. For example, the processing part 81 performs transmission and reception of the signal with the wagon ECU 11 through wireless communication.

Further, the controller that can control traveling of the wagon 1 may also be mounted on the side of the wagon 1, and the traveling control of the wagon 1 may be performed by the controller on the side of the wagon 1 and the control device 8. For example, the control device 8 may perform a traveling plan of setting a designated point, a traveling route, or the like, and the controller mounted on the wagon 1 may control a moving speed, a moving direction, or the like, of the wagon 1 on the basis of the traveling plan.

The storage part 82 stores data or the like used in the processing by the processing part 81, in addition to the program executed by the processing part 81. In addition, the storage part 82 stores a database DB on vehicle body information or the like of the wagon 1.

For example, the system SY2 can be used for a conveyance work or the like in a warehouse. That is, the wagon 1 may be used as a conveyance vehicle by mounting the cargo box or the like on the wagon 1, and the traveling control of the conveyance vehicle may be performed by the control device 8. Accordingly, when the conveyance work is performed using a plurality of conveyance vehicles that can autonomously travel in the warehouse, in consideration of collision avoidance or the like between the conveyance vehicles, traveling of the conveyance vehicles is controlled by the control device 8.

Then, even in such a system configuration, the wagon 1 can control the operation of the engine 14 to charge the battery 13 using the wagon ECU 11. Accordingly, on the side of the control device 8 that functions as the autonomous controller of the wagon 1, there is no need to control the operation of the engine 14, and the configuration of the control device 8 can be simplified.

As described above, according to the embodiment, in the system in which the traveling control of the wagon 1 is remotely performed by the control device 8, the operation of the engine 14 can be effectively controlled.

In addition, while determination of whether the engine 14 is operated is performed by the wagon 1 in the embodiment, determination of whether the wagon 1 travel or not may be determined by the wagon 1 itself. Specifically, the processing part 111 of the wagon ECU 11 may stop the traveling when the predetermined condition is satisfied during the traveling of the wagon 1. For example, the processing part 111 may stop the traveling when the sensor value of the angular speed sensor of the attitude detection unit 18 does not satisfy the predetermined condition. Accordingly, the traveling of the wagon 1 can be stopped when the wagon 1 is in an instable attitude or the like, and possibility of falling or the like of the wagon 1 can be reduced. In addition, for example, the processing part 111 may stop the traveling when the sensor value of the acceleration sensor of the attitude detection unit 18 does not satisfy the predetermined condition. Accordingly, the traveling can be stopped when the wagon 1 is in an instable state, for example, when vibrations applied to the wagon 1 are great, or the like.

In addition, while various pieces of information are acquired by the sensors mounted on the wagon 1 in the embodiment, at least some pieces of the information may be acquired from the outside through communication or the like. That is, a method of acquiring the information is not limited. For example, when the sensor such as the camera or the like is provided in the traveling region of the wagon 1, the processing part 111 may receive the detection result of the camera and determine presence or absence of a person in the vicinity on the basis of the received detection result.

In addition, while the example in which the autonomous control device 2 performs autonomous traveling control of the wagon 1 has been described in the embodiment, the autonomous control device 2 may be a control device or the like configured to receive an input of an operator. For example, the autonomous control device 2 may be a wireless communication device such as a remote controller or the like, and may transmit the control signal on the basis of the input by the operator to the processing part 111. That is, the control related to the traveling route of the wagon 1 may be performed by autonomous control, or may be performed manually by an operation or the like of the user using a remote controller or the like. In addition, in the embodiment, a driver's seat is provided on the wagon 1, and the control related to the traveling of the wagon 1 may be performed by a driving operation of the user. The processing part 111 can perform control of the traveling part and the power system of the wagon 1, i.e., machine control of the wagon 1 on the basis of the control related to these traveling routes.

In addition, the system SY1 or the system SY2 according to the embodiment can be applied to the conveyance work of loading and conveying the object. While the conveyance work tends to have a relatively long traveling distance and the battery 13 may need to be charged more frequently, the battery 13 can be charged by the engine 14 according to the situation by the processing part 111. In addition, the processing part 111 can effectively control the operation of the engine 14 even in a situation in which a person goes back and forth between indoors and outdoors or a situation in which a person works in surroundings.

FIG. 16 is a view showing a variant of a position information table. In the variant shown in FIG. 16, the position information record further has values of region attributes, in addition to values of position information, inclination information and date and time of updating. The region attributes indicate attributes information related to traveling in the region and engine starting. For example, the region attributes have three values of "traveling is possible," "starting is impossible" and "traveling is impossible." "Traveling is possible" indicates that the wagon 1 can travel in the region and the engine can also be started. While "starting is impossible" indicates that the wagon 1 can travel in the region, but the engine cannot be started due to a problem such as an inclination or the like. "Traveling is impossible" indicates that the wagon 1 cannot travel and the engine cannot also be started due to a problem such as an inclination or the like in the region.

Values of such region attributes may be values determined on the basis of the outputs of the sensors in the wagon 1 that travels in the region indicated by the position information in actuality, or may be values determined by the controller 43 of the management device 4 on the basis of the inclination information notified from the wagon 1. Since such a position information table is used, the region determining part 434 can determine the power generatable region with a smaller calculation amount or processing amount. In addition, it is possible to appropriately control starting of the engine 14 according to the inclination with respect to the wagon 1 with no sensor such as the attitude detection unit 18 or the like by performing traveling control based on the position information table with a value of such an attributes region. For example, the position information table shown in FIG. 10 or FIG. 16 may be stored in the storage part 22 of the autonomous control device 2, or may be stored in the storage part 82 of the control device 8. The processing part 21 or the processing part 81 can perform control according to the current position of the wagon 1 on the basis of the position information table.

Further, the region attributes are values determined depending on the inclination in the region. However, the values of the region attributes with respect to the same inclination information may not have to always be the same. For example, as described above, when the values of the region attributes are values determined in the wagon 1 that travels in the region indicated by the position information in actuality, the values may be varied depending on the type or specification of the wagon 1 that travels in actual.

The position information record may further have loading attributes. The loading attributes indicate attributes information related to loading of the cargo in the wagon 1 in the region. For example, the loading attributes have two values of "loading is possible" and "loading is impossible." "Loading is possible" indicates that the wagon 1 in the region can travel within a predetermined safety standard range in a state in which the cargo is loaded. For example, "within the predetermined safety standard range" indicates that the possibility of dropping the loaded cargo is smaller than a predetermined standard. "Loading is impossible" indicates that the wagon 1 in the region cannot travel within the predetermined safety standard range in a state in which the cargo is loaded.

Since such a position information table is used, the route determining part 432 or the car allocation determining part 433 can determine a route within the predetermined safety standard range or determine the wagon 1 that is allocated.

The processing part 111 of the wagon 1 may be configured to determine the power generatable region without requiring the management device 4 to retrieve the power generatable region. For example, the processing part 111 is configured to store a history of information acquired from the sensors in the region in which the host device (the wagon 1) traveled in the past in the storage part 112 for a predetermined time. The processing part 111 may retrieve the position information having a value of inclination information that enables the host device to start the engine 14 from a history of such information. The processing part 111 may control the host device to move to the position on the basis of the result obtained through such retrieval. In addition, when the power generatable region cannot be obtained as the retrieval result, the processing part 111 may control the host device to advance toward the current destination.

Figure 17:
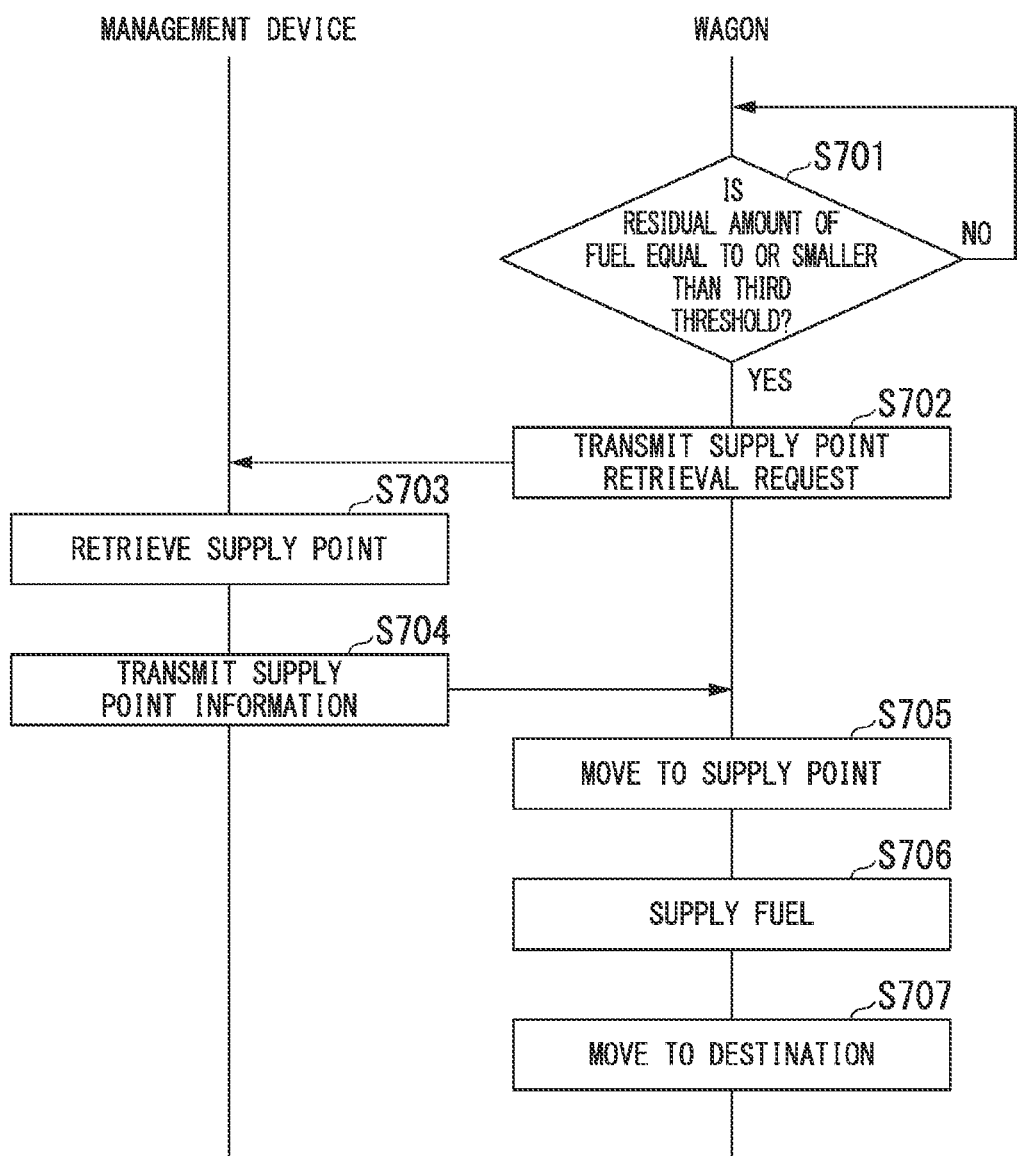
FIG. 17 is a sequence chart showing a variant of an operation of the wagon management system.

FIG. 17 is a sequence chart showing a variant of the operation of the wagon management system 100. The wagon 1 may start the operation of the sequence chart shown in FIG. 17 at a predetermined period.

In S701, the processing part 111 checks whether a residual quantity of the fuel used in the engine 14 is equal to or smaller than a third threshold. The residual quantity of the fuel may be measured by, for example, the engine sensor 141. More specifically, the residual quantity of the fuel may be measured as the weight of the fuel in the fuel tank or a height of a liquid surface of the fuel. The processing part 111 advances to processing of S702 when the residual quantity of the fuel is equal to or smaller than the third threshold, and terminates the sequence chart when the residual quantity of the fuel exceeds the third threshold. Further, it is desirable that the third threshold is a value indicating a state in which the wagon can travel for a while with such residual quantity. By setting in this way, the residual quantity of the fuel is smaller than the third threshold and also smaller than the voltage of the battery 13, and thus, it is possible to prevent the wagon 11 from getting stuck on the way.

In S702, the processing part 111 generates a supply point retrieval request. The supply point retrieval request is information that requires retrieval and notification of a position of a supply point. The position of the required supply point is desirably a position at which the wagon can arrive in a state in which the residual quantity of the fuel is equal to or smaller than the third threshold. In generation of the supply point retrieval request, the processing part 111 acquires position information of the host device (the wagon 1) on the basis of the output of the position sensor 19, and includes the position information in the supply point retrieval request. In addition, the processing part 111 may include the wagon identification information of the host device in the supply point retrieval request. The processing part 111 transmits the supply point retrieval request to the management device 4 via the communication part 12.

In S703, the region determining part 434 of the management device 4 acquires the position information from the received supply point retrieval request when the supply point retrieval request is received. The region determining part 434 retrieves the supply point disposed in the vicinity on the basis of the acquired position information. As described above, "the vicinity" disclosed herein is desirably a position at which the wagon 1 can arrive with the residual quantity of the current fuel that is equal to or smaller than the third threshold. The region determining part 434 may retrieve, for example, the supply point on the basis of the information related to the positions of one or a plurality of supply points previously stored in the storage part (not shown).

In S704, the region determining part 434 of the management device 4 generates supply point information including position information indicating the retrieval result. The region determining part 434 transmits the generated supply point information to the wagon 1 of the request source.

In S705, the processing part 111 of the wagon 1 receives the supply point information from the management device 4. The processing part 111 moves the wagon 1 to a position indicated by the position information included in the received supply point information. After that, the processing part 111 moves to the supply point on the basis of the position information output by the position sensor 19 and the position information included in the supply point information.

In S706, the processing part 111 of the wagon 1 receives supply of the fuel by a work of a worker resided at the supply point. The supply of the fuel may be automatically performed (with no human intervention) by connecting the wagon 1 to a predetermined supply facility.

In S707, the processing part 111 of the wagon 1 begins to move to the original destination. Further, in moving to the destination, the processing part 111 of the wagon 1 may return to the place where the processing of step S702 was performed once, and then, move to the destination. In addition, the processing part 111 of the wagon 1 may search for the route from the supply point to the destination again, and move to the destination on the basis of the search result. A new route from such a supply point to a destination may be determined by the route determining part 432 of the management device 4.

With this configuration, the wagon 1 can be efficiently operated by movement to a facility (supply point) having a refueling function. For this reason, the situation where the engine 14 cannot be started can be avoided by the environment upon traveling, and the wagon 1 can continue traveling more efficiently.

In addition, after the processing of S701 shown in FIG. 17, a controller 111 of the wagon 1 may not transmit the supply point retrieval request to the management device 4, and the controller 111 may select the supply point and start movement. In this case, the storage part 112 of the wagon 1 may store position information of one or a plurality of supply points in advance. With this configuration, it is possible to start movement to the supply point without making an inquiry to the management device 4. In addition, after the processing of S701 shown in FIG. 17, the controller 111 of the wagon 1 may notify the user terminal 6 that the residual quantity of the fuel is equal to or smaller than the third threshold. In addition, after the processing of S703 or S704 shown in FIG. 17, the management device 4 may notify the user terminal 6 that the residual quantity of the fuel is equal to or smaller than the third threshold.

<Conclusion of Embodiment>

The embodiment discloses at least the following wagon and management device.

1. The wagon (for example, 1) of the embodiment includes:
   a communication part (for example, 12) configured to communicate with other device;
   an electric motor (for example, 10) configured to generate a traveling driving force;
   a battery (for example, 13) configured to supply electric power to the electric motor;
   a position sensor (for example, 19) configured to acquire position information indicating a position of a host wagon;
   an attitude detection unit (for example, 18) configured to acquire inclination information indicating a tilt of the host wagon; and
   a controller (for example, 111) configured to transmit the position information and the inclination information, which were acquired in a same region, to other device (for example, 4) via the communication part while associating the position information and the inclination information.

According to the embodiment, since the position information and the inclination information obtained through traveling in actuality are transmitted to the other device while the position information and the inclination information are associated with each other, more accurate correspondence between the position information and the inclination information is obtained. Accordingly, in the processing of the control or the like after that, the processing based on the more accurate information can be performed.

2. According to the embodiment, an engine (for example, 14) configured to drive a generator (for example, 15) that is able to charge the battery is further provided.

According to the embodiment, the generator that is able to charge the battery is able to be driven by the engine.

3. The wagon (for example, 1) of the embodiment includes:
   an electric motor (for example, 10) configured to generate a traveling driving force;
   a battery (for example, 13) configured to supply electric power to the electric motor;
   an engine (for example, 14) configured to drive a generator (for example, 15) that is able to charge the battery; and
   a controller (for example, 111) configured to acquire position information of a region in which the engine is able to be started and to move a host wagon to the region in a case a voltage of the battery becomes equal to or smaller than a predetermined threshold.

According to the embodiment, when the voltage of the battery is equal to or smaller than the predetermined threshold, it is possible to move the host wagon to the region in which the engine is able to be started. For this reason, it is possible to avoid the situation where the wagon continuously travels the region in which the engine is not able to be started and the battery runs out to unable to continue the traveling.

4. According to the embodiment,
   the controller acquires the position information of the region in which the engine is able to be started on the basis of information acquired at a position at which the host wagon has traveled in the past.

According to the embodiment, the position information of the region in which the engine is able to be started can be acquired from the position at which the host wagon has traveled in the past. For this reason, it is possible to return to the position at which the host wagon has traveled in the past and start the engine.

5. According to the embodiment, a communication part configured to communicate with other device is further provided, and the controller requests the position information of the region via the communication part with respect to a management device that has information related to a region where the host wagon is traveling and that retrieves the region, and acquires the position information by receiving the position information of the region from the management device.

According to the embodiment, by requesting the management device, the position information of the region in which the engine is able to be started can be acquired. For this reason, it is possible to obtain the position information of the region in which the engine is able to be started among the region in which the host wagon has never traveled in the past.

6. The management device (for example, 4) of the embodiment includes:

a position information storage part (for example, 421) configured to store position information, which is related to a region in which a wagon (for example, 1) is traveling, and inclination information, which indicates an inclination of a ground surface at the position, in association with each other;

a communication part (for example, 41) configured to communicate with the wagon; and a controller (for example, 43) configured to retrieve the position information of the region within a predetermined range from a position of the wagon on the basis of the information stored in the position information storage part and to notify the wagon, in a case position information of a region in which an engine of the wagon is able to be started is requested from the wagon.

According to the embodiment, it is possible to notify the wagon of the position information of the region in which the engine is able to be started according to the request from the wagon.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A wagon comprising:
    an electric motor configured to generate a traveling driving force;
    a battery configured to supply electric power to the electric motor;
    an engine configured to drive a generator that is able to charge the battery;
    a communication part configured to communicate information;
    a position sensor configured to measure position information; and
    a controller configured to acquire, from the position sensor via the communication part, position information of a region in which the engine is able to be started and to move a host wagon to the region in a case a voltage of the battery becomes equal to or smaller than a predetermined threshold.

2. The wagon according to claim 1, wherein the controller acquires the position information of the region in which the engine is able to be started on the basis of information acquired at a position at which the host wagon has traveled in the past.

3. The wagon according to claim 1 wherein the communication part is further configured to communicate with other device,
    wherein the controller requests the position information of the region via the communication part with respect to a management device that has information related to a region where the host wagon is traveling and that retrieves the region, and acquires the position information by receiving the position information of the region from the management device.

* * * * *